US012807628B2

(12) United States Patent
Matsuoka et al.

(10) Patent No.: US 12,807,628 B2
(45) Date of Patent: Nov. 24, 2026

(54) PROCESS STABILIZER, ORGANIC MATERIAL COMPOSITION, AND METHOD FOR STABILIZING ORGANIC MATERIAL

(71) Applicant: SUMITOMO CHEMICAL COMPANY, LIMITED, Tokyo (JP)

(72) Inventors: Fumiaki Matsuoka, Osaka (JP); Junji Morimoto, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 259 days.

(21) Appl. No.: 18/842,096

(22) PCT Filed: Feb. 15, 2023

(86) PCT No.: PCT/JP2023/005115

§ 371 (c)(1),
(2) Date: Aug. 28, 2024

(87) PCT Pub. No.: WO2023/166978

PCT Pub. Date: Sep. 7, 2023

(65) Prior Publication Data

US 2025/0171476 A1 May 29, 2025

(30) Foreign Application Priority Data

Mar. 3, 2022 (JP) ................................ 2022-032691

(51) Int. Cl.
*C08K 5/52* (2006.01)
*C07F 9/6574* (2006.01)
*C08K 5/529* (2006.01)

(52) U.S. Cl.
CPC .......... *C07F 9/65744* (2013.01); *C08K 5/529* (2013.01)

(58) Field of Classification Search
CPC ............................ C07F 9/65744; C08K 5/529
See application file for complete search history.

(56) References Cited

U.S. PATENT DOCUMENTS

| | | | |
|---|---|---|---|
| 5,889,095 | A | 3/1999 | Inui et al. |
| 2017/0015816 | A1 | 1/2017 | Kimura |
| 2019/0144633 | A1 | 5/2019 | Kimura |

FOREIGN PATENT DOCUMENTS

| | | | |
|---|---|---|---|
| JP | 3876479 B2 | 1/2007 |
| JP | 5925402 B1 | 5/2016 |
| WO | WO-2015/136717 A1 | 9/2015 |

*Primary Examiner* — Shawquia Jackson
(74) *Attorney, Agent, or Firm* — Foley & Lardner LLP

(57) ABSTRACT

A compound (I) represented by Formula (I) wherein, $R^1$, $R^2$, $R^4$, and $R^5$ each independently represent a hydrogen atom, an alkyl group having 1 to 8 carbon atoms, a cycloalkyl group having 5 to 8 carbon atoms, an alkylcycloalkyl group having 6 to 12 carbon atoms, an aralkyl group having 7 to 12 carbon atoms, or a phenyl group; $R^3$s each independently represent a hydrogen atom or an alkyl group having 1 to 8 carbon atoms;; a compound (II) represented by Formula (II) wherein, $R^1$ and $R^2$ each independently represent a hydrogen atom, an alkyl group having 1 to 8 carbon atoms, a cycloalkyl group having 5 to 8 carbon atoms, an alkylcycloalkyl group having 6 to 12 carbon atoms, an aralkyl group having 7 to 12 carbon atoms, or a phenyl group; $R^3$s each independently represent a hydrogen atom or an alkyl group having 1 to 8 carbon atoms.

12 Claims, No Drawings

PROCESS STABILIZER, ORGANIC MATERIAL COMPOSITION, AND METHOD FOR STABILIZING ORGANIC MATERIAL

CROSS-REFERENCE TO RELATED APPLICATIONS

The present application claims priority under 35 U.S.C. § 371 to International Patent Application No. PCT/JP2023/005115, filed Feb. 15, 2023, which claims priority to and the benefit of Japanese Patent Application No. 2022-032691, filed on Mar. 3, 2022. The contents of these applications are hereby incorporated by reference in their entireties.

TECHNICAL FIELD

The present invention relates to: a process stabilizer that contains a specific phenolic compound and an amine compound having a hydroxyalkyl group; an organic material composition that contains a specific phenolic compound and an amine compound having a hydroxyalkyl group; and a method of stabilizing an organic material with the use of a specific phenolic compound and an amine compound having a hydroxyalkyl group.

BACKGROUND ART

Organic materials, such as thermoplastic resins, thermosetting resins, natural or synthetic rubbers, mineral oils, lubricants, adhesives, and paints, are deteriorated by the action of heat, oxygen, and the like during production, processing, and use, and this may greatly impair the commercial values of the organic materials in association with deterioration in strength and physical properties, change in flowability, coloring, deterioration of surface properties, and the like that are caused by phenomena such as molecular cleavage and molecular crosslinking.

For the purpose of preventing such deterioration by heat or oxygen, various phenolic antioxidants and phosphorus-based antioxidants have been developed, and it is known that organic materials can be stabilized by adding thereto these antioxidants (Patent Documents 1 and 2).

PRIOR ART DOCUMENTS

Patent Documents

Patent Document 1: Japanese Patent No. 3876479
Patent Document 2: WO 2015/136717

SUMMARY OF THE INVENTION

Problems to be Solved by the Invention

A variety of process stabilizers for organic materials are known as described above, and organic materials are used in various environments and sometimes exposed to, for example, a fossil fuel combustion gas such as an automobile exhaust gas. In such a case, discoloration of the organic materials may be facilitated by an oxidizing gas, such as nitrogen oxide contained in the combustion gas. Therefore, there is still a demand for a process stabilizer which has a process stabilization effect and with which discoloration caused by an oxidizing gas such as a NOx gas hardly occurs.

In Patent Document 1, it is described that the phosphite ester compounds of C-1 to C-12 that correspond to a specific Formula (I) (Examples 1 to 10) exhibit less coloring caused by a NOx gas as compared to the phosphite ester compounds of P-1 and P-3 that do not correspond to the specific Formula (I) (Comparative Examples 1 and 2); however, the effect of reducing the coloring caused by a NOx gas is not sufficient in some cases, and there is thus still a demand for a further improvement in reducing the coloring.

Further, Patent Document 2 discloses a process stabilizer that contains a compound represented by a specific Formula (I) and a compound represented by a specific Formula (II); however, no attention is given to the coloring caused by a NOx gas, and the coloring caused by a NOx gas cannot be sufficiently reduced in some cases.

In view of the above, an object of the present invention is to provide a process stabilizer which is effective for improving the thermal stability in processing of an organic material, and with which discoloration caused by an oxidizing gas, particularly a NOx gas, hardly occurs.

Solutions to the Problems

The present inventors studied various compounds in detail so as to solve the above-described problem, and discovered that a mixture of specific phenolic compounds (I) and (II) and an amine compound (A) having a hydroxyalkyl group is not only effective for improving the stability of a resin, but also is hardly discolored by an oxidizing gas such as a NOx gas, thereby completing the present invention.

That is, the present invention encompasses the following preferred aspects.

[1] A process stabilizer, containing:

a compound (I) represented by Formula (I):

(I)

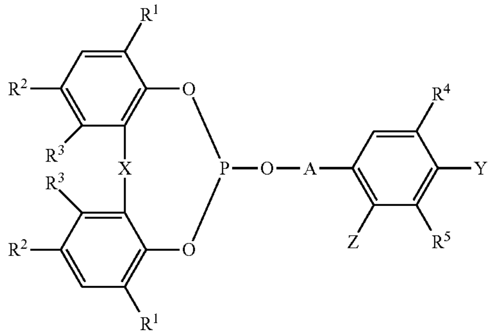

[in Formula (I), $R^1$, $R^2$, $R^4$, and $R^5$ each independently represent a hydrogen atom, an alkyl group having 1 to 8 carbon atoms, a cycloalkyl group having 5 to 8 carbon atoms, an alkylcycloalkyl group having 6 to 12 carbon atoms, an aralkyl group having 7 to 12 carbon atoms, or a phenyl group, $R^3$s each independently represent a hydrogen atom or an alkyl group having 1 to 8 carbon atoms, X represents a single bond, a sulfur atom, or a —CH(—$R^6$)— group (wherein, $R^6$ represents a hydrogen atom, an alkyl group having 1 to 8 carbon atoms, or a cycloalkyl group having 5 to 8 carbon atoms), A represents an alkylene group having 1 to 8 carbon atoms or a *—C(=O)—$R^7$— group (wherein, $R^7$ represents a single bond or an alkylene group having 1 to 8 carbon atoms, and * represents a bond on the oxygen side), and one of Y and Z represents a hydroxyl group, an alkoxy group having 1 to 8 carbon atoms, or an aralkyloxy group having 7 to 12 carbon atoms, while the other represents a hydrogen atom or an alkyl group having 1 to 8 carbon atoms];

a compound (II) represented by Formula (II):

(II)

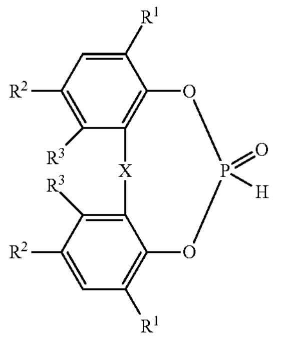

[in Formula (II), $R^1$ and $R^2$ each independently represent a hydrogen atom, an alkyl group having 1 to 8 carbon atoms, a cycloalkyl group having 5 to 8 carbon atoms, an alkylcycloalkyl group having 6 to 12 carbon atoms, an aralkyl group having 7 to 12 carbon atoms, or a phenyl group, $R^3$s each independently represent a hydrogen atom or an alkyl group having 1 to 8 carbon atoms, and X represents a single bond, a sulfur atom, or a —CH(—$R^6$)— group (wherein, $R^6$ represents a hydrogen atom, an alkyl group having 1 to 8 carbon atoms, or a cycloalkyl group having 5 to 8 carbon atoms)]; and an amine compound (A) having a hydroxyalkyl group, wherein, with respect to 100 parts by mass of the compound (I), the content of the compound (II) is 0.005 to 4 parts by mass, and the content of the amine compound (A) is 0.01 to 15 parts by mass.

[2] The process stabilizer according to [1], wherein the amine compound (A) is an alkanolamine.

[3] The process stabilizer according to [2], wherein the alkanolamine is represented by Formula (III):

(III)

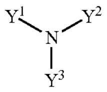

[in Formula (III), $Y^1$, $Y^2$, and $Y^3$ each independently represent a hydrogen atom, an alkyl group having 1 to 8 carbon atoms, or an alkyl group having 1 to 8 carbon atoms and at least one hydroxy group, provided that at least one of $Y^1$ to $Y^3$ represents an alkyl group having 1 to 8 carbon atoms and at least one hydroxy group], or Formula (IV):

(IV)

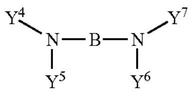

[in Formula (IV), $Y^4$, $Y^5$, $Y^6$, and $Y^7$ each independently represent a hydrogen atom, an alkyl group having 1 to 8 carbon atoms, or an alkyl group having 1 to 8 carbon atoms and at least one hydroxy group, provided that at least one of $Y^4$ to $Y^7$ represents an alkyl group having 1 to 8 carbon atoms and at least one hydroxy group, and B represents an alkylene group having 1 to 4 carbon atoms].

[4] The process stabilizer according to [3], wherein the alkanolamine is represented by Formula (III).

[5] The process stabilizer according to [3] or [4], wherein $Y^1$, $Y^2$, and $Y^3$ in Formula (III), and $Y^4$, $Y^5$, $Y^6$, and $Y^7$ in Formula (IV) each independently represent $—CH_2—CH(OH)—R^6$ [wherein, $R^6$ represents a hydrogen atom or an alkyl group having 1 to 3 carbon atoms].

[6] An organic material composition, containing:

a compound (I) represented by Formula (I):

(I)

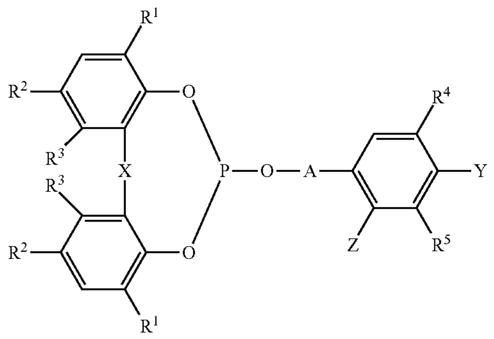

[in Formula (I), $R^1$, $R^2$, $R^4$, and $R^5$ each independently represent a hydrogen atom, an alkyl group having 1 to 8 carbon atoms, a cycloalkyl group having 5 to 8 carbon atoms, an alkylcycloalkyl group having 6 to 12 carbon atoms, an aralkyl group having 7 to 12 carbon atoms, or a phenyl group, $R^3$s each independently represent a hydrogen atom or an alkyl group having 1 to 8 carbon atoms, X represents a single bond, a sulfur atom, or a —CH(—$R^6$)— group (wherein, $R^6$ represents a hydrogen atom, an alkyl group having 1 to 8 carbon atoms, or a cycloalkyl group having 5 to 8 carbon atoms), A represents an alkylene group having 1 to 8 carbon atoms or a *—C(=O)—$R^7$— group (wherein, $R^7$ represents a single bond or an alkylene group having 1 to 8 carbon atoms, and * represents a bond on the oxygen side), and one of Y and Z represents a hydroxyl group, an alkoxy group having 1 to 8 carbon atoms, or an aralkyloxy group having 7 to 12 carbon atoms, while the other represents a hydrogen atom or an alkyl group having 1 to 8 carbon atoms];

a compound (II) represented by Formula (II):

(II)

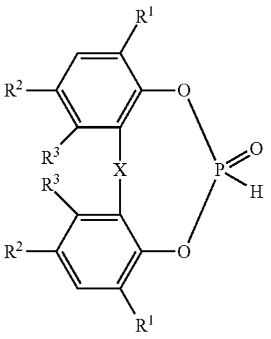

[in Formula (II), $R^1$ and $R^2$ each independently represent a hydrogen atom, an alkyl group having 1 to 8 carbon atoms, a cycloalkyl group having 5 to 8 carbon atoms, an alkylcycloalkyl group having 6 to 12 carbon atoms, an aralkyl group having 7 to 12 carbon atoms, or a phenyl group, $R^3$s each independently represent a hydrogen atom or an alkyl group having 1 to 8 carbon atoms, and X represents a single bond, a sulfur atom, or a —CH(—$R^6$)— group (wherein, $R^6$ represents a hydrogen atom, an alkyl group having 1 to 8 carbon atoms, or a cycloalkyl group having 5 to 8 carbon atoms)];

an amine compound (A) having a hydroxyalkyl group; and an organic material wherein, with respect to 100 parts by mass of the compound (I), the content of the compound (II) is 0.005 to 4 parts by mass, and the content of the amine compound (A) is 0.01 to 15 parts by mass.

[7] The organic material composition according to [6], containing the process stabilizer according to any one of [1] to [5] as the compound (I), the compound (II), and the amine compound (A).

[8] The organic material composition according to [6] or [7], wherein the organic material is a thermoplastic resin.

[9] The organic material composition according to [8], wherein the thermoplastic resin is a polyolefin or an engineering plastic.

[10] A method of stabilizing an organic material, the method including:

adding a compound (I) represented by Formula (I), a compound (II) represented by Formula (II), and an amine compound (A) having a hydroxyalkyl group to the organic material in such amounts that, with respect to 100 parts by mass of the compound (I), the content of the compound (II) is 0.005 to 4 parts by mass, and the content of the amine compound (A) is 0.01 to 15 parts by mass:

(I)

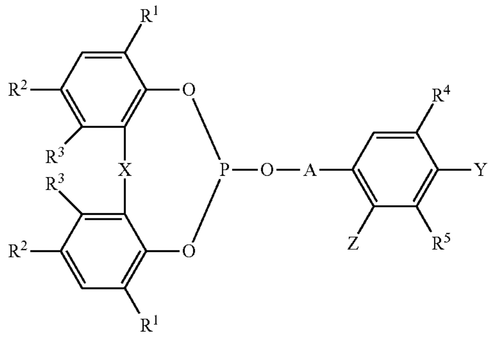

[in Formula (I), $R^1$, $R^2$, $R^4$, and $R^5$ each independently represent a hydrogen atom, an alkyl group having 1 to 8 carbon atoms, a cycloalkyl group having 5 to 8 carbon atoms, an alkylcycloalkyl group having 6 to 12 carbon atoms, an aralkyl group having 7 to 12 carbon atoms, or a phenyl group, $R^3$s each independently represent a hydrogen atom or an alkyl group having 1 to 8 carbon atoms, X represents a single bond, a sulfur atom, or a —CH(—$R^6$)— group (wherein, $R^6$ represents a hydrogen atom, an alkyl group having 1 to 8 carbon atoms, or a cycloalkyl group having 5 to 8 carbon atoms), A represents an alkylene group having 1 to 8 carbon atoms or a *—C(═O)—$R^7$— group (wherein, $R^7$ represents a single bond or an alkylene group having 1 to 8 carbon atoms, and * represents a bond on the oxygen side), and one of Y and Z represents a hydroxyl group, an alkoxy group having 1 to 8 carbon atoms, or an aralkyloxy group having 7 to 12 carbon atoms, while the other represents a hydrogen atom or an alkyl group having 1 to 8 carbon atoms], (II)

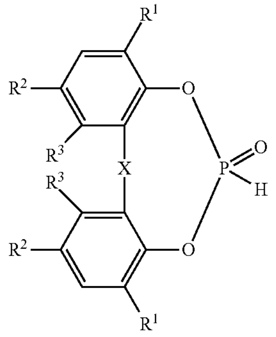

[in Formula (II), $R^1$ and $R^2$ each independently represent a hydrogen atom, an alkyl group having 1 to 8 carbon atoms, a cycloalkyl group having 5 to 8 carbon atoms, an alkylcycloalkyl group having 6 to 12 carbon atoms, an aralkyl group having 7 to 12 carbon atoms, or a phenyl group, $R^3$s each independently represent a hydrogen atom or an alkyl group having 1 to 8 carbon atoms, and X represents a single bond, a sulfur atom, or a —CH(—$R^6$)— group (wherein, $R^6$ represents a hydrogen atom, an alkyl group having 1 to 8 carbon atoms, or a cycloalkyl group having 5 to 8 carbon atoms)]; or adding the process stabilizer according to any one of [1] to [5] to the organic material.

[11] The method according to [10], wherein the organic material is a thermoplastic resin.

[12] The method according to [11], wherein the thermoplastic resin is a polyolefin or an engineering plastic.

Effects of the Invention

According to the present invention, a process stabilizer which is effective for improving the thermal stability in processing of an organic material, and with which discoloration caused by an oxidizing gas, particularly a NOx gas, hardly occurs, can be provided. Further, the organic material composition of the present invention exhibits not only a high thermal stability, but also is hardly discolored by an oxidizing gas, particularly a NOx gas.

DETAILED DESCRIPTION

Embodiments of the present invention will now be described in detail. It is noted here, however, that the scope of the present invention is not limited to the embodiments described below, and various modifications can be made without departing from the gist of the present invention. Further, when plural upper limit values and lower limit values are stated for a specific characteristic, a combination of any of these upper limit values and lower limit values can be taken as a preferred numerical range.

Process Stabilizer

The process stabilizer of the present invention is a process stabilizer containing:

a compound (I) represented by Formula (I):

(I)

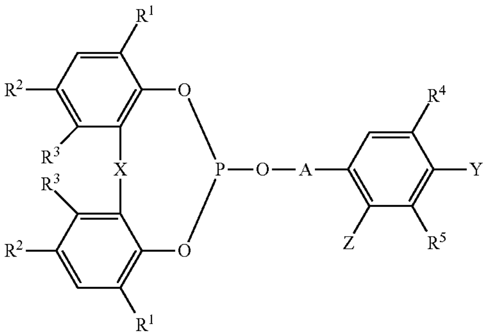

[in Formula (I), $R^1$, $R^2$, $R^4$, and $R^5$ each independently represent a hydrogen atom, an alkyl group having 1 to 8 carbon atoms, a cycloalkyl group having 5 to 8 carbon atoms, an alkylcycloalkyl group having 6 to 12 carbon atoms, an aralkyl group having 7 to 12 carbon atoms, or a phenyl group, $R^3$s each independently represent a hydrogen atom or an alkyl group having 1 to 8 carbon atoms, X represents a single bond, a sulfur atom, or a —CH(—$R^6$)— group (wherein, $R^6$ represents a hydrogen atom, an alkyl group having 1 to 8 carbon atoms, or a cycloalkyl group having 5 to 8 carbon atoms), A represents an alkylene group having 1 to 8 carbon atoms or a *—C(=O)—$R^7$— group (wherein, $R^7$ represents a single bond or an alkylene group having 1 to 8 carbon atoms, and * represents a bond on the oxygen side), and one of Y and Z represents a hydroxyl group, an alkoxy group having 1 to 8 carbon atoms, or an aralkyloxy group having 7 to 12 carbon atoms, while the other represents a hydrogen atom or an alkyl group having 1 to 8 carbon atoms];

a compound (II) represented by Formula (II):

(II)

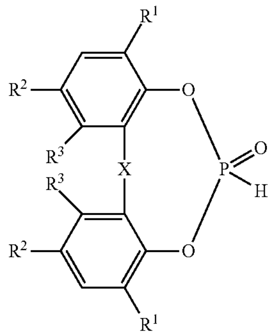

[in Formula (II), $R^1$ and $R^2$ each independently represent a hydrogen atom, an alkyl group having 1 to 8 carbon atoms, a cycloalkyl group having 5 to 8 carbon atoms, an alkylcycloalkyl group having 6 to 12 carbon atoms, an aralkyl group having 7 to 12 carbon atoms, or a phenyl group, $R^3$s each independently represent a hydrogen atom or an alkyl group having 1 to 8 carbon atoms, and X represents a single bond, a sulfur atom, or a —CH(—$R^6$)— group (wherein, $R^6$ represents a hydrogen atom, an alkyl group having 1 to 8 carbon atoms, or a cycloalkyl group having 5 to 8 carbon atoms)]; and an amine compound (A) having a hydroxyalkyl group, wherein, with respect to 100 parts by mass of the compound (I), the content of the compound (II) is 0.005 to 4 parts by mass, and the content of the amine compound (A) is 0.01 to 15 parts by mass.

The process stabilizer of the present invention, which contains the compound (II) and the amine compound (A) in specific amounts in addition to the compound (I), is not only effective for improving the thermal stability in processing of an organic material, but also hardly causes discoloration by an oxidizing gas. The reason for this is not clear; however, it is believed that, by using the compound (I) in combination with the compound (II) and the amine compound (A) in specific amounts, particularly the conversion of the compounds (I) and (II) into colored substances by an oxidizing gas is inhibited. When a phenolic compound is discolored by an oxidizing gas, the phenolic compound is believed to be converted into a quinone body, and it is surprising that such conversion into a quinone body can be inhibited by using specific amounts of the compound (II) and the amine compound (A) in combination with the compound (I). It is noted here, however, that the present invention is not limited to the above-described mechanism by any means.

Compound I

The process stabilizer of the present invention contains at least one compound (I) represented by the above-described Formula (I).

In Formula (I), $R^1$, $R^2$, $R^4$, and $R^5$ each independently represent a hydrogen atom, an alkyl group having 1 to 8 carbon atoms, a cycloalkyl group having 5 to 8 carbon atoms, an alkylcycloalkyl group having 6 to 12 carbon atoms, an aralkyl group having 7 to 12 carbon atoms, or a phenyl group.

Examples of the alkyl group having 1 to 8 carbon atoms include a methyl group, an ethyl group, an n-propyl group, an isopropyl group, an n-butyl group, a sec-butyl group, a t-butyl group, an n-pentyl group, a t-pentyl group, a 2-methyl-butyl group, a 3-methylbutyl group, a 2-ethyl-propyl group, an n-hexyl group, an n-heptyl group, an isoheptyl group, an n-octyl group, an isooctyl group, and a 2-ethyl-hexyl group.

Examples of the cycloalkyl group having 5 to 8 carbon atoms include a cyclopentyl group, a cyclohexyl group, a cycloheptyl group, and a cyclooctyl group.

Examples of the alkylcycloalkyl group having 6 to 12 carbon atoms include a 1-methylcyclopentyl group, a 1-methylcyclohexyl group, and a 1-methyl-4-i-propylcyclohexyl group.

Examples of the aralkyl group having 7 to 12 carbon atoms include a benzyl group, an α-methylbenzyl group, and an α,α-dimethylbenzyl group.

$R^1$, $R^2$, and $R^4$ are each preferably an alkyl group having 1 to 8 carbon atoms, a cycloalkyl group having 5 to 8 carbon atoms, or an alkylcycloalkyl group having 6 to 12 carbon atoms.

$R^1$ and $R^4$ are each more preferably a t-alkyl group, such as a t-butyl group, a t-pentyl group, or a t-octyl group, a cyclohexyl group, or a 1-methylcyclohexyl group.

$R^2$ is more preferably an alkyl group having 1 to 5 carbon atoms, such as a methyl group, an ethyl group, an n-propyl group, an i-propyl group, an n-butyl group, an i-butyl group, a sec-butyl group, a t-butyl group, or a t-pentyl group, still more preferably a methyl group, a t-butyl group, or a t-pentyl group.

$R^5$ is preferably a hydrogen atom, an alkyl group having 1 to 8 carbon atoms, or a cycloalkyl group having 5 to 8 carbon atoms, more preferably a hydrogen atom or an alkyl group having 1 to 5 carbon atoms, such as a methyl group, an ethyl group, an n-propyl group, an i-propyl group, an n-butyl group, an i-butyl group, a sec-butyl group, a t-butyl group, or a t-pentyl group.

In Formula (1), $R^3$s each independently represent a hydrogen atom or an alkyl group having 1 to 8 carbon atoms. Examples of the alkyl group having 1 to 8 carbon atoms include the same groups as those exemplified above. $R^3$s are each preferably a hydrogen atom or an alkyl group having 1 to 5 carbon atoms, more preferably a hydrogen atom or a methyl group.

In Formula (I), X represents a single bond, a sulfur atom, or a —CH(—$R^6$)— group (wherein, $R^6$ represents a hydrogen atom, an alkyl group having 1 to 8 carbon atoms, or a cycloalkyl group having 5 to 8 carbon atoms). Examples of the alkyl group having 1 to 8 carbon atoms and the cycloalkyl group having 5 to 8 carbon atoms, which are represented $R^6$, include the same groups as those exemplified above. X is preferably a methylene group substituted with an alkyl group having 1 to 4 carbon atoms, such as a methyl group, an ethyl group, an n-propyl group, an i-propyl group, an n-butyl group, an i-butyl group, or a t-butyl group, or a single bond, more preferably a single bond.

In Formula (I), A represents an alkylene group having 1 to 8 carbon atoms or a *—C(═O)—$R^7$— group (wherein, $R^7$ represents a single bond or an alkylene group having 1 to 8 carbon atoms, and * represents a bond on the oxygen side). Examples of the alkylene group having 1 to 8 carbon atoms include a methylene group, an ethylene group, a propylene group, a butylene group, a pentamethylene group, a hexamethylene group, an octamethylene group, and a 2,2-dimethyl-1,3-propylene group. A is preferably a propylene group. In the *—C(═O)—$R^7$— group, * indicates that a carbonyl group is bound to an oxygen atom of a phosphite group. $R^7$ is preferably a single bond or an ethylene group.

In Formula (I), one of Y and Z represents a hydroxyl group, an alkoxy group having 1 to 8 carbon atoms, or an aralkyloxy group having 7 to 12 carbon atoms, while the other represents a hydrogen atom or an alkyl group having 1 to 8 carbon atoms. Examples of the alkyl group having 1 to 8 carbon atoms include the same groups as those exemplified above. Examples of the aralkyloxy group having 7 to 12 carbon atoms include a benzyloxy group, an α-methylbenzyloxy group, and an α,α-dimethylbenzyloxy group. It is preferred that one of Y and Z be a hydroxyl group and the other be a hydrogen atom or an alkyl group having 1 to 8 carbon atoms, and it is more preferred that Y be a hydroxyl group and Z be a hydrogen atom or an alkyl group having 1 to 8 carbon atoms.

The process stabilizer of the present invention may contain the compound (I) represented by Formula (I) singly, or in combination of two or more kinds thereof.

Specific examples of the compound (I) include 2,4,8,10-tetra-t-butyl-6-[3-(3-methyl-4-hydroxy-5-t-butylphenyl)propoxy]dibenzo[d,f][1,3,2]dioxaphosphepin, 6-[3-(3,5-di-t-butyl-4-hydroxyphenyl)propoxy]-2,4,8,10-tetra-t-butyldibenzo[d,f][1,3,2]dioxaphosphepin, 6-[3-(3,5-di-t-butyl-4-hydroxyphenyl)propoxy]-4,8-di-t-butyl-2,10-dimethyl-12H-dibenzo[d,g][1,3,2]dioxaphosphocin, and 6-[3-(3,5-di-t-butyl-4-hydroxyphenyl)propionyloxy]-4,8-di-t-butyl-2,10-dimethyl-12H-dibenzo[d,g][1,3,2]dioxaphosphocin. The compound (I) is preferably 2,4,8,10-tetra-t-butyl-6-[3-(3-methyl-4-hydroxy-5-t-butylphenyl)propoxy]dibenzo[d,f][1,3,2]dioxaphosphepin.

As the compound (I), a commercially available product can be used as well. Examples of the commercially available product include SUMILIZER (registered trademark) GP (manufactured by Sumitomo Chemical Co., Ltd.).

Compound II

The process stabilizer of the present invention contains at least one compound (II) represented by the above-described Formula (II).

With regard to $R^1$ and $R^2$ in Formula (II), the descriptions relating to $R^1$ and $R^2$ in Formula (I) are applicable in the same manner. Further, with regard to $R^3$ in Formula (II), the descriptions relating to $R^3$ in Formula (I) are applicable in the same manner. Moreover, with regard to X in Formula (II), the descriptions relating to X in Formula (I) are applicable in the same manner.

Examples of the compound (II) include 6-oxo-2,4,8,10-tetra-t-butyl-dibenzo[d,f][1,3,2]dioxaphosphepin, 6-oxo-4,8-di-t-butyl-2,10-dimethyl-dibenzo[d,g][1,3,2]dioxaphosphepin, 6-oxo-2,4,8,10-tetra-t-butyl-dibenzo[d,f][1,3,2]dioxaphosphocin, 6-oxo-4,8-di-t-butyl-2,10-dimethyl-dibenzo[d,g][1,3,2]dioxaphosphocin, 6-oxo-4,8-di-t-butyl-2,10-dimethyl-12H-dibenzo[d,g][1,3,2]dioxaphosphepin, and 6-oxo-4,8-di-t-butyl-2,10-dimethyl-12H-dibenzo[d,g][1,3,2]dioxaphosphocin. The compound (II) is preferably 6-oxo-2,4,8,10-tetra-t-butyl-dibenzo[d,f][1,3,2]dioxaphosphepin.

The compound (II) can be produced in accordance with, for example, the description of U.S. Pat. No. 5,475,042 (Examples 1 and 2).

In the process stabilizer of the present invention, the content of the compound (II) is 0.005 to 4 parts by mass with respect to 100 parts by mass of the compound (I). When the content of the compound (II) is less than 0.005 parts by mass, the thermal stability in processing of an organic material cannot be sufficiently improved, and the discoloration caused by an oxidizing gas cannot be sufficiently inhibited. In addition, when the content of the compound (II) is more than 4 parts by mass, the discoloration caused by an oxidizing gas cannot be sufficiently inhibited. From the standpoint of improving the thermal stability in processing of an organic material as well as the standpoint of improving the effect of inhibiting the discoloration caused by an oxidizing gas, the content of the compound (II) is preferably 0.01 parts by mass or more, more preferably 0.03 parts by mass or more, still more preferably 0.05 parts by mass or more, with respect to 100 parts by mass of the compound (I). Further, from the standpoint of improving the thermal stability in processing of an organic material as well as the standpoint of inhibiting the discoloration caused by an oxidizing gas, the content of the compound (II) is preferably 3 parts by mass or less, more preferably 2 parts by mass or less, still more preferably 1.5 parts by mass or less.

In the process stabilizer of the present invention, the content of the compound (II) with respect to 100 parts by mass of the compound (I) may be determined using an analyzer such as a liquid chromatograph, or may be calculated from an added ratio in the preparation of the process stabilizer or an organic material composition. In the case of measuring the content of the compound (II) using a liquid chromatograph, the measurement is preferably performed under the following measurement conditions.

Measurement Conditions

Column: Sumipax ODS A-212 (6 mmφ×150 mm, filler diameter: 5 μm)
Column temperature: 40 °C
Mobile phase: (Liquid A) 0.1%-by-mass ammonium acetate/water
(Liquid B) 0.1%-by-mass ammonium acetate/methanol
Mobile phase gradient: 0→20 min (liquid A: 20→0% by mass (1% by mass/min), liquid B: 80→100% by mass (1% by mass/min)), 20→45 min (liquid A: 0% by mass, liquid B: 100% by mass)
Flow rate: 1.0 mL/min
Detection method: UV (280 nm)
Sample concentration: 5 mg/mL
Injection amount: 10 μL Amine Compound (A)

The process stabilizer of the present invention contains at least one amine compound having a hydroxyalkyl group. The amine compound having a hydroxyalkyl group is hereinafter also referred to as "amine compound (A). As the amine compound (A), one kind of an amine compound having a hydroxyalkyl group may be used, or two or more kinds of amine compounds may be used. In the present specification, the amine compound (A) is a compound containing at least one nitrogen atom and at least one linear or branched alkyl group having at least one hydroxy group, and may be a monoamine compound, a diamine compound, a triamine compound, or a tetramine compound; however, the amine compound (A) is preferably a monoamine compound or a diamine compound, more preferably a monoamine compound. The amine compound (A) is preferably (A1) a compound in which one or two of the three hydrogen atoms of ammonia are substituted with hydroxyalkyl groups, while the remaining hydrogen atom is unsubstituted or substituted with a substituent such as an aliphatic group or an aromatic group; (A2) a compound in which all of the three hydrogen atoms of ammonia are substituted with hydroxyalkyl groups; (A3) a compound in which two nitrogen atoms are linked via an alkylene group (preferably an alkylene group having 1 to 4 carbon atoms), and one, two, or three of four hydrogen atoms bound to each nitrogen atom are substituted with hydroxyalkyl groups, while the remaining hydrogen atom is unsubstituted or substituted with a substituent such as an aliphatic group or an aromatic group; or (A4) a compound in which two nitrogen atoms are linked via an alkylene group (preferably an alkylene group having 1 to 4 carbon atoms), and all of four hydrogen atoms bound to each nitrogen atom are substituted with hydroxyalkyl groups. The amine compound (A) is more preferably an alkanolamine. The alkanolamine is a saturated aliphatic amine having a hydroxy group in its molecule. Further, the amine compound (A) may be a primary amine compound, a secondary amine compound, or a tertiary amine compound; however, it is preferably a tertiary amine compound.

In one preferred embodiment of the present invention, the amine compound (A) is preferably an alkanolamine, and is more preferably represented by Formula (III):

(III)

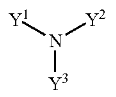

[in Formula (III), $Y^1$, $Y^2$, and $Y^3$ each independently represent a hydrogen atom, an alkyl group having 1 to 8 carbon atoms, or an alkyl group having 1 to 8 carbon atoms and at least one hydroxy group, provided that at least one of $Y^1$ to $Y^3$ represents an alkyl group having 1 to 8 carbon atoms and at least one hydroxy group], or Formula (IV):

(IV)

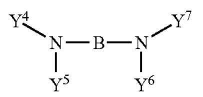

[in Formula (IV), $Y^4$, $Y^5$, $Y^6$, and $Y^7$ each independently represent a hydrogen atom, an alkyl group having 1 to 8 carbon atoms, or an alkyl group having 1 to 8 carbon atoms and at least one hydroxy group, provided that at least one of $Y^4$ to $Y^7$ represents an alkyl group having 1 to 8 carbon atoms and at least one hydroxy group; and B represents an alkylene group having 1 to 4 carbon atoms].

The alkanolamine represented by Formula (III) or (IV) readily interacts with the compound (I) and the compound (II) and, therefore, is believed to be likely to inhibit, for example, conversion of the compound (I) into a quinone body by an oxidizing gas, and discoloration caused by an oxidizing gas.

Examples of the alkyl group having 1 to 8 carbon atoms include a methyl group, an ethyl group, an n-propyl group, an isopropyl group, an n-butyl group, a sec-butyl group, a t-butyl group, an n-pentyl group, a t-pentyl group, a 2-methyl-butyl group, a 3-methylbutyl group, a 2-ethylpropyl group, an n-hexyl group, an n-heptyl group, an isoheptyl group, an n-octyl group, an isooctyl group, and a 2-ethyl-hexyl group. The number of carbon atoms of the alkyl group is preferably 1 to 6, more preferably 1 to 4.

Examples of the alkyl group having 1 to 8 carbon atoms and at least one hydroxy group include the above-exemplified alkyl groups in which at least one hydrogen atom is substituted with a hydroxy group. Specific examples thereof include a hydroxymethyl group, a hydroxyethyl group, a hydroxypropyl group, and a hydroxybutyl group. The number of hydroxy groups in the alkyl group having 1 to 8 carbon atoms and at least one hydroxy group is preferably 1 to 3, more preferably 1 or 2, still more preferably 1.

Examples of the alkylene group having 1 to 4 carbon atoms include a methylene group, an ethylene group, an n-propylene group, an isopropylene group, an n-butylene group, and an isobutylene group. The alkylene group having 1 to 4 carbon atoms is preferably a linear alkylene group having 1 to 4 carbon atoms, more preferably a methylene group, an ethylene group, or an n-propylene group, still more preferably a methylene group or an ethylene group, yet still more preferably an ethylene group. The number of carbon atoms of the alkylene group is preferably 1 to 3, more preferably 1 or 2, still more preferably 2.

Specific examples of the compound represented by Formula (III) include monoethanolamine, diethanolamine, triethanolamine, monoisopropanolamine, diisopropanolamine, triisopropanolamine, tributanolamine, tripentanolamine, methylethanolamine, methylisopropanolamine, methyldiethanolamine, methyldiisopropanolamine, diethanolisopropanolamine, diisopropanolethanolamine, and tris(2-hydroxybutyl)amine.

Specific examples of the compound represented by Formula (IV) include tetrahydroxyethyl ethylenediamine and N,N,N',N'-tetrakis(2-hydroxypropyl) ethylenediamine.

$Y^1$, $Y^2$, and $Y^3$ in Formula (III), and $Y^4$, $Y^5$, $Y^6$, and $Y^7$ in Formula (IV) preferably each independently represent $—CH_2—CH(OH)—R^6$ [wherein, $R^6$ represents a hydrogen atom or an alkyl group having 1 to 3 carbon atoms].

In the process stabilizer of the present invention, the content of the amine compound (A) is 0.01 to 15 parts by mass with respect to 100 parts by mass of the compound (I). When the content of the amine compound (A) is less than 0.01 parts by mass, the discoloration caused by an oxidizing gas cannot be sufficiently inhibited. Also when the content of the compound (II) is more than 15 parts by mass, the discoloration caused by an oxidizing gas cannot be sufficiently inhibited. From the standpoint of inhibiting the discoloration caused by an oxidizing gas, the content of the amine compound (A) is preferably 0.05 parts by mass or more, more preferably 0.1 parts by mass or more, still more preferably 0.5 parts by mass or more, with respect to 100 parts by mass of the compound (I). Further, from the same standpoint, the content of the amine compound (A) is preferably 12 parts by mass or less, more preferably 10 parts by mass or less, still more preferably 7 parts by mass or less. From the standpoint of further improving the effect of inhibiting the discoloration caused by an oxidizing gas, the content of the amine compound (A) may be, for example, 4% by mass or less, 3% by mass or less, or 2% by mass or less.

In the process stabilizer of the present invention, the content of the amine compound (A) with respect to 100 parts by mass of the compound (I) may be determined using an analyzer such as a liquid chromatograph, or may be calculated from an added ratio in the preparation of the process stabilizer or an organic material composition.

By adding the process stabilizer of the present invention, which contains the compound (I) and specific amounts of the compound (II) and the amine compound (A), to an organic material such as a thermoplastic resin, for example, thermal degradation and oxidative degradation of the organic material are reduced, so that the organic material can be stabilized and, for example, a reduction in viscosity and coloring can be inhibited. In addition, according to the process stabilizer of the present invention, discoloration caused by an oxidizing gas can be inhibited. The process stabilizer may be a material that contains only the compound (I) represented by Formula (I), the compound (II) represented by Formula (II), and the amine compound (A) in the above-described ratio, or a material further containing at least one other additive that may be contained in the below-described organic material composition, in addition to the compound (I), the compound (II), and the amine compound (A). The process stabilizer of the present invention may also be a material that contains at least one organic material in addition to the compound (I), the compound (II), and the amine compound (A). Such a material is also referred to as, for example, "masterbatch".

Organic Material Composition and Method of Stabilizing Organic Material

By adding the process stabilizer of the present invention to an organic material, or by adding a compound (I) represented by Formula (I), a compound (II) represented by Formula (II), and an amine compound (A) at a specific ratio to an organic material, thermal degradation, oxidative degradation, and the like of the organic material are reduced, so that the organic material can be stabilized and, for example, not only a reduction in viscosity and coloring can be inhibited, but also discoloration caused by an oxidizing gas can be inhibited. Therefore, the process stabilizer of the present invention is appropriate as an organic material stabilizer.

The present invention also provides: a method of stabilizing an organic material, which method includes adding the above-described process stabilizer; and a method of stabilizing an organic material, which method includes adding a compound (I) represented by Formula (I), a compound (II) represented by Formula (II), and an amine compound (A) at a specific ratio. Further, the present invention provides a stabilized organic material composition which contains: an organic material; and the process stabilizer of the present invention, or a compound (I) represented by Formula (I), a compound (II) represented by Formula (II), and an amine compound (A) at a specific ratio.

Examples of the organic material that can be stabilized by the process stabilizer of the present invention include the following, but it is not limited to these organic materials. The organic material may be one kind of an organic material or a mixture of two or more kinds of organic materials.

(1) Polyethylene such as high density polyethylene (HD-PE), low density polyethylene (LD-PE), linear low density polyethylene (LLDPE),
(2) Polypropylene,
(3) Methylpentene polymer,
(4) EAA (ethylene/ethyl acrylate copolymer) resin, (5) Ethylene/vinyl acetate copolymer resin,
(6) Polystyrenes such as polystyrene, poly(p-methylstyrene), poly($\alpha$-methylstyrene),
(7) AS (acrylonitrile/styrene copolymer) resin,
(8) ABS (acrylonitrile/butadiene/styrene copolymer) resin,
(9) AAS (special acrylic rubber/acrylonitrile/styrene copolymer) resin,
(10) ACS (acrylonitrile/chlorinated polyethylene/styrene copolymer) resin,
(11) Chlorinated polyethylene, polychloroprene, chlorinated rubber,
(12) Polyvinyl chloride, polyvinylidene chloride,
(13) Methacrylic resin,
(14) Ethylene/vinyl alcohol copolymer resin,
(15) Fluororesin,
(16) Polyacetal,
(17) Grafted polyphenylene ether resin and polyphenylene sulfide resin,
(18) Polyurethane,
(19) Polyamide,
(20) Polyester resin such as polyethylene terephthalate, polybutylene terephthalate,
(21) Polycarbonate,
(22) Polyacrylate,
(23) Polysulfone, polyether ether ketone, polyether sulphone,
(24) Thermoplastic resins, such as aromatic polyester resin,
(25) Epoxy resin,
(26) Diallyl phthalate prepolymer,
(27) Silicone resin,
(28) Unsaturated polyester resin,
(29) Acrylic modified benzoguanamine resin,
(30) Benzoguanamine/melamine resin,
(31) Thermosetting resins, such as urea resin,
(32) Polybutadiene,
(33) 1,2-Polybutadiene,
(34) Polyisoprene,
(35) Styrene/butadiene copolymer,
(36) Butadiene/acrylonitrile copolymer,
(37) Ethylene/propylene copolymer,
(38) Silicone rubber,
(39) Epichlorhydrin rubber,
(40) Acrylic rubber,
(41) Natural rubber,
(42) Chlorine rubber type paint,
(43) Polyester resin paint,
(44) Urethane resin paint,
(45) Epoxy resin paint,
(46) Acrylic resin paint,
(47) Vinyl resin paint,
(48) Amino alkyd resin paint,
(49) Alkyd resin paint,
(50) Nitrocellulose resin paint,
(51) Oil paint,
(52) Wax,
(53) Lubricating oil and so on.

Among them, thermoplastic resins, particularly polyethylene, for example, polyolefins such as HD-PE, LD-PE, LLDPE and polypropylene, engineering plastics such as polyamide, polyethylene terephthalate, polybutylene terephthalate and polycarbonate, and the like are preferably used.

The polyolefin is not particularly limited, and may be, for example, one obtained by radical polymerization or may be one produced by polymerization using a catalyst containing a metal of group IVb, Vb, VIb or VIII of the periodic table. Examples of the catalyst containing such a metal include a metal complex having one or more ligands, for example, an oxide, a halogen compound, an alcoholate, an ester, and an aryl coordinated by a $\pi$ or $\sigma$ bond. These complexes may be used as they are, or they may be supported on a substrate such as magnesium chloride, titanium chloride, alumina, silicon oxide or the like. As the polyolefin, for example, one produced by using a Ziegler-Natta catalyst, a TNZ catalyst, a metallocene catalyst, a Phillips catalyst or the like is preferably used.

Engineering plastics are also not particularly limited. The polyamide resin is one having an amide bond in the polymer chain, and may be anything as long as it can be heated and melted. The polyamide resin may be produced by any method, for example, one produced by a condensation reaction of a diamine and a dicarboxylic acid, a condensation reaction of an aminocarboxylic acid, a ring-opening polymerization of a lactam or the like. Examples of the polyamide resin include nylon 66, nylon 69, nylon 610, nylon 612, polybis-(p-aminocyclohexyl)methandodecamide, nylon 46, nylon 6, nylon 12, Nylon 66/6 which is a copolymer of nylon 66 and nylon 6, nylon 6/12 and the like. The polyester resin is one having an ester bond in the polymer chain and may be anything as long as it can be heated and melted. Examples thereof include a polyester obtained by polycondensation of a dicarboxylic acid and a dihydroxy compound or the like. The polyester resin may be either a homopolyester or a copolyester. The polycarbonate resin is one having a carbonate bond in the polymer chain and may be anything as long as it can be heated and melted. Examples thereof include a polycarbonate resin obtained by reacting an aromatic hydroxy compound or additionally to this a small amount of a polyhydroxy compound with a carbonate precursor such as phosgene or diphenyl carbonate in the presence of a solvent, an acid acceptor, or a molecular weight regulator. The polycarbonate resin may be linear, branched, or may be a copolymer.

By adding the compound (I) represented by Formula (I), the compound (II) represented by Formula (II), and an amine compound (A) to an organic material, the organic material can be stabilized and, the discoloration of the organic materials caused by an oxidizing gas can be prevented. In this case, the compound (I), the compound (II) and the amine compound (A) are added to an organic material in the amounts such that the content of the compound (II) is 0.005 to 4 parts by mass relative to 100 parts by mass of compound (I) and the content of amine compound (A) is 0.01 to 15 parts by mass relative to 100 parts by mass of compound (I). The content of the compound (II) relative to 100 parts by mass of compound (I) is, from the viewpoint of meterability during use, the viewpoint of increasing the synergistic stabilizing effect of the organic material achieved by using the compound (I) and the compound (II) in combination, and the viewpoint of increasing the effect of preventing discoloration caused by an oxidizing gas, preferably 0.01 parts by mass or more, more preferably 0.03 parts by mass or more, and even more preferably 0.05 parts by mass or more, and from the viewpoint of increasing the effect of preventing discoloration caused by an oxidizing gas, preferably 3 parts by mass or less, more preferably 2 parts by mass or less, even more preferably 1.5 parts by mass or less. The content of the amine compound (A) relative to 100 parts by mass of compound (I) is, from the viewpoint of increasing the effect of preventing discoloration caused by an oxidizing gas, preferably 0.05 parts by mass or more, more preferably 0.1 part by mass or more, even more preferably 0.5 parts by mass or more, and, from the viewpoint of increasing the effect of preventing discoloration caused by an oxidizing gas, preferably 12 parts by mass or less, more preferably 10 parts by mass or less, even more preferably 7 parts by mass or less. From the viewpoint of further enhancing the effect of preventing discoloration caused by an oxidizing gas, the content may be, for example, 4 mass % or less, 3 mass % or less, or 2 mass % or less.

The addition of the compound (I) represented by Formula (1) and the compound (II) represented by Formula (II) to an organic material may be carried out by an addition of the process stabilizer according to the present invention to an organic material. In either case, the compound (I) and the compound (II) are contained in the organic material in a specific quantitative ratio.

When the organic material is stabilized by adding the process stabilizer, or, the compound (I), the compound (II) and the amine compound (A) to the organic material, the total content of the compound (I), the compound (II) and the amine compound (A) is, from the viewpoint of stabilizing the organic material, preferably 0.005 parts by mass or more, more preferably 0.01 part by mass or more, even more preferably 0.05 part by mass or more, based on 100 parts by mass of the organic material. The total content of the compound (I), the compound (II) and the amine compound (A) is usually 5 parts by mass or less, preferably 3 parts by mass or less, more preferably 1 part by mass or less, based on 100 parts by mass of the organic material from the viewpoint of efficiently stabilizing the organic material and from the economical viewpoint.

In adding the compound (I) represented by Formula (I), the compound (II) represented by Formula (II) and the amine compound (A) to the organic material, further additives can be added to the organic material as needed, and examples of the additive include phenolic antioxidants, sulfur-based antioxidants, phosphorus antioxidants, anti-aging agent, ultraviolet absorbers, light stabilizers, peroxide scavengers, polyamide stabilizers, hydroxylamines, lubricants, plasticizers, flame retardants, nucleating agents, metal deactivators, antistatic agents, pigments, fillers, antiblocking agents, surfactants, processing aids, foaming agents, emulsifiers, brighteners, calcium stearate, neutralizers such as hydrotalcite, further, color improvers such as 9,10-dihydro-9-oxa-10-phosphophenanthrene-10-oxide, supplementary stabilizers such as benzofurans and indolines described in U.S. Pat. Nos. 4,325,853, 4,338,244, 5,175,312, 5,216,053, 5,252,643, 4,316,611, DE-A-4,316,622, DE-A-4,316,876, EP-A-589,839, and EP-A-591,102, and the like. These additives can be added to the organic material simultaneously with the compounds (I) and (II) and the amine compound (A) to be contained in the organic material composition of the present invention or can be added to the organic material at a stage different from the compounds (I) and (II) and the amine compound (A) to be contained in the organic material composition of the present invention. As the additives, one kind of additives may be used, or two or more kinds of additives may be used in combination.

Examples of the phenolic antioxidant include the followings. As the phenolic antioxidant, the following compounds may be used alone, or two or more of them may be used in combination.

(1) Examples of Alkylated Monophenols 2,6-Di-t-butyl-4-methylphenol, 2,4,6-tri-t-butylphenol, 2,6-di-t-butylphenol, 2-t-butyl-4,6-dimethylphenol, 2,6-di-t-butyl-4-ethylphenol, 2,6-di-t-butyl-4-n-butylphenol, 2,6-di-t-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-t-butyl-4-methoxymethylphenol, 2,6-di-nonyl-4-methylphenol, 2,4-dimethyl-6-(1'-methylundecyl-1'-yl)phenol, 2,4-dimethyl-6-(1'-methylheptadecyl-l'-yl)phenol, 2,4-dimethyl-6-(1'-methyl tridecyl-l'-yl)phenol and any mixtures thereof.

(2) Examples of Alkylthiomethylphenols 2,4-Dioctylthiomethyl-6-t-butylphenol, 2,4-dioctylthiomethyl-6-methylphenol, 2,4-dioctylthiomethyl-6-ethylphenol, 2,6-didodecylthiomethyl-4-nonylphenol and any mixtures thereof.

(3) Examples of Hydroquinone and Alkylated Hydroquinones 2,6-Di-t-butyl-4-methoxyphenol, 2,5-di-t-butylhydroquinone, 2,5-di-t-amylhydroquinone, 2,6-diphenyl-4-octadecyloxyphenol, 2,6-di-t-butylhydroquinone, 2,5-di-t-butyl-4-hydroxyanisole, 3,5-di-t-butyl-4-hydroxyphenylstearate, bis(3,5-di-t-butyl-4-hydroxyphenyl) adipate and any mixtures thereof.

(4) Examples of Tocopherols

α-Tocopherol, β-tocopherol, γ-tocopherol, δ-tocopherol and any mixtures thereof.

(5) Examples of Hydroxylated Thiodiphenyl Ethers 2,2'-Thiobis(6-t-butylphenol), 2,2'-thiobis(4-methyl-6-t-butylphenol), 2,2'-thiobis(4-octylphenol), 4,4'-thiobis(3-methyl-6-t-butylphenol), 4,4'-thiobis(2-methyl-6-t-butylphenol), 4,4'-thiobis(3,6-di-t-amylphenol), 4,4'-(2,6-dimethyl-4-hydroxyphenyl)disulfide and the like.

(6) Examples of Alkylidene Bisphenols and Derivatives Thereof 2,2'-Methylenebis(4-methyl-6-t-butylphenol), 2,2'-methylenebis(4-ethyl-6-t-butylphenol), 2,2'-methylenebis[4-methyl-6-(α-methylcyclohexyl)phenol]], 2,2'-methylenebis(4-methyl-6-cyclohexylphenol), 2,2'-methylenebis(4-methyl-6-nonylphenol), 2,2'-methylenebis(4,6-di-t-butylphenol), 2,2'-ethylidenebis(4,6-di-t-butylphenol), 2,2'-ethylidenebis(4-isobutyl-6-t-butylphenol), 2,2'-methylenebis[6-(α-methylbenzyl)-4-nonylphenol], 2,2'-methylenebis[4,6-(α,α-dimethylbenzyl)-4-nonylphenol], 4,4'-methylenebis(6-t-butyl-2-methylphenol), 4,4'-methylenebis(2,6-di-t-butylphenol), 4,4'-butylidenebis(3-methyl-6-t-butylphenol), 1,1-bis(4-hydroxyphenyl)cyclohexane, 1,1-bis(5-t-butyl-4-hydroxy-2-methylphenyl)butane, 2,6-bis(3-t-butyl-5-methyl-2-hydroxybenzyl)-4-methylphenol, 1,1,3-tris(5-t-butyl-4-hydroxy-2-methylphenyl)butane, 1,1-bis(5-t-butyl-4-hydroxy-2-methylphenyl)-3-n-dodecylmercaptobutane, ethyleneglycolbis[3,3-bis-3'-butyl-4'-hydroxyphenyl)butyrate], bis(3-t-butyl-4-hydroxy-5-methylphenyl)dicyclopentadiene, bis[2-(3'-t-butyl-2'-hydroxy-5'-methylbenzyl)-6-t-butyl-4-methylphenyl] terephthalate, 1,1-bis(3,5-dimethyl-2-hydroxyphenyl) butane, 2,2-bis(3,5-di-t-butyl-4-hydroxyphenyl)propane, 2,2-bis(5-t-butyl-4-hydroxy-2-methylphenyl)-4-n-dodecylmercaptobutane, 1,1,5,5-tetra(5-t-butyl-4-hydroxy-2-methylphenyl)pentane, 2-t-butyl-6-(3'-t-butyl-5'-methyl-2'-hydroxybenzyl)-4-methylphenylacrylate, 2,4-di-t-pentyl-6-[1-(2-hydroxy-3,5-di-t-pentylphenyl)ethyl]phenylacrylate and any mixtures thereof.

(7) Examples of O-, N- and S-benzyl Derivatives 3,5,3',5'-Tetra-t-butyl-4,4'-dihydroxydibenzylether, octadecyl-4-hydroxy-3,5-dimethylbenzylmercaptoacetate, tris(3,5-di-t-butyl-4-hydroxybenzyl)amine, bis(4-t-butyl-3-hydroxy-2,6-dimethylbenzyl)dithio terephthalate, bis(3,5-di-t-butyl-4-hydroxybenzyl)sulfide, isooctyl-3,5-di-t-butyl-4-hydroxybenzylmercaptoacetate and any mixtures thereof.

(8) Examples of Hydroxybenzylated Malonate Derivatives

Dioctadecyl-2,2-bis(3,5-di-t-butyl-2-hydroxybenzyl)malonate, dioctadecyl 2-(3-t-butyl-4-hydroxy-5-methylbenzyl) malonate, didodecylmercaptoethyl-2,2-bis(3,5-di-t-butyl-4-hydroxybenzyl)malonate, bis[4-(1,1,3,3-tetramethylbutyl) phenyl]-2,2-bis(3,5-di-t-butyl-4-hydroxybenzyl)malonate and any mixtures thereof.

(9) Examples of Aromatic Hydroxybenzyl Derivatives 1,3,5-Trimethyl-2,4,6-tris(3,5-di-t-butyl-4-hydroxybenzyl)benzene, 1,4-bis(3,5-di-t-butyl-4-hydroxybenzyl)-2,3,5,6-tetramethylbenzene, 2,4,6-tris(3,5-t-butyl-4-hydroxybenzyl)phenol and any mixtures thereof.

(10) Examples of Triazine Derivatives 2,4-Bis(n-octylthio)-6-(4-hydroxy-3,5-di-t-butylanilino)-1,3,5-triazine, 2-n-octylthio-4,6-bis(4-hydroxy-3,5-di-t-butylanilino)-1,3,5-triazine, 2-n-octylthio-4,6-bis(4-hydroxy-3,5-di-t-butylphenoxy)1,3,5-triazine, 2,4,6-tris(3,5-di-t-butyl-4-phenoxy)-1,3,5-triazine, tris(4-t-butyl-3-hydroxy-2,6-dimethylbenzyl)isocyanurate, tris(3,5-di-t-butyl-4-hydroxybenzyl)isocyanurate, 2,4,6-tris(3,5-di-t-butyl-4-hydroxyphenylethyl)-1,3,5-triazine, 2,4,6-tris(3,5-di-t-butyl-4-hydroxyphenylpropyl)-1,3,5-triazine, tris(3,5-dicyclohexyl-4-hydroxybenzyl)isocyanurate, tris[2-(3',5'-di-t-butyl-4'-hydroxycinnamoyloxy)ethyl]isocyanurate and any mixtures thereof.

(11) Examples of Benzylphosphonate Derivatives

Dimethyl-3,5-di-t-butyl-4-hydroxybenzylphosphonate, diethyl-3,5-di-t-butyl-4-hydroxybenzylphosphonate, dioctadecyl-3,5-di-t-butyl-4-hydroxybenzylphosphonate, dioctadecyl-5-t-butyl-4-hydroxy-3-methylbenzylphosphonate, calcium salt of 3,5-di-t-butyl-4-hydroxybenzylphosphonic acid monoester and any mixtures thereof.

(12) Examples of Acylaminophenol Derivatives

4-Hydroxyl lauric acid anilide, 4-hydroxystearic acid anilide, octyl-N-(3,5-di-t-butyl-4-hydroxyphenyl)carbanate and any mixtures thereof.

(13) Examples of Esters of β-(3,5-di-t-butyl-4-hydroxyphenyl)propionic acid with the Following Monohydric or Polyhydric Alcohols Methanol, ethanol, octanol, octadecanol, ethylene glycol, 1,3-propanediol, 1,4-butanediol, 1,6-hexanediol, 1,9-nonanediol, neopentyl glycol, diethylene glycol, thioethylene glycol, spiroglycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylol propane, 4-hydroxymethyl-1-phospha-2,6,7-trioxabicyclo[2,2,2]octane and any mixtures thereof.

(14) Examples of Esters of β-(5-t-butyl-4-hydroxy-3-methylphenyl)propionic acid with the Following Monohydric or Polyhydric Alcohols Methanol, ethanol, octanol, octadecanol, ethylene glycol, 1,3-propanediol, 1,4-butanediol, 1,6-hexanediol, 1,9-nonanediol, neopentyl glycol, diethylene glycol, thioethylene glycol, spiroglycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylol propane, 4-hydroxymethyl-1-phospha-2,6,7-trioxabicyclo[2,2,2]octane and any mixtures thereof.

(15) Examples of Esters of β-(3,5-dicyclohexyl-4-hydroxyphenyl)propionic acid with the Following Monohydric or Polyhydric Alcohols Methanol, ethanol, octanol, octadecanol, ethylene glycol, 1,3-propanediol, 1,4-butanediol, 1,6-hexanediol, 1,9-nonanediol, neopentyl glycol, diethylene glycol, thioethylene glycol, spiroglycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylol propane, 4-hydroxymethyl-1-phospha-2,6,7-trioxabicyclo[2,2,2]octane and any mixtures thereof.

(16) Examples of Esters of 3,5-di-t-butyl-4-hydroxyphenyl acetic acid with the Following Monohydric or Polyhydric Alcohols Methanol, ethanol, octanol, octadecanol, ethylene glycol, 1,3-propanediol, 1,4-butanediol, 1,6-hexanediol, 1,9-nonanediol, neopentyl glycol, diethylene glycol, thioethylene glycol, spiroglycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylol propane, 4-hydroxymethyl-1-phospha-2,6,7-trioxabicyclo[2,2,2]octane and any mixtures thereof.

(17) Examples of Amides of β-(3,5-di-t-butyl-4-hydroxyphenyl)propionic acid

N,N'-bis[3-(3',5'-di-t-butyl-4'-hydroxyphenyl)propionyl] hydrazine, N,N'-bis[3-(3',5'-di-t-butyl-4'-hydroxyphenyl) propionyl]hexamethylenediamine, N,N'-bis[3-(3',5'-di-t-butyl-4'-hydroxyphenyl)propionyl]trimethylenediamine and any mixtures thereof.

Examples of the sulfur-based antioxidant include the followings.

Dilauryl 3,3'-thiodipropionate, tridecyl 3,3'-thiodipropionate, dimyristyl 3,3'-thiodipropionate, distearyl 3,3'-thiodipropionate, laurylstearyl 3,3'-thiodipropionate, neopentanetetrayltetrakis(3-laurylthiopropionate) and the like.

Examples of the phosphorus antioxidant include the followings. As the phosphorus antioxidant, the following compounds may be used alone, or two or more of them may be used in combination.

Triphenyl phosphite, tris(nonylphenyl)phosphite, tris(2,4-di-t-butylphenyl)phosphite, trilaurylphosphite, trioctadecylphosphite, distearyl pentaerythritol diphosphite, diisodecyl pentaerythritol diphosphite, bis(2,4-di-t-butylphenyl) pentaerythritol diphosphite, bis(2,4-di-t-butyl-6-methylphenyl)pentaerythritol diphosphite, bis(2,6-di-t-butyl-4-methylphenyl)pentaerythritol diphosphite, bis(2,4,6-tri-t-butylphenyl)pentaerythritol diphosphite, tristearylsorbitol triphosphite, tetrakis(2,4-di-t-butylphenyl)-4,4'-diphenylenediphosphonite, 2,2'-methylenebis(4,6-di-t-butylphenyl) 2-ethylhexylphosphite, 2,2'-ethylidenebis (4,6-di-t-butylphenyl)fluorophosphite, bis(2,4-di-t-butyl-6-methylphenyl)ethyl phosphite, bis(2,4-di-t-butyl-6-methylphenyl)methyl phosphite, 2-(2,4,6-tri-t-butylphenyl)-5-ethyl-5-butyl-1,3,2-oxaphosphorinane, 2,2',2"-nitrilo [triethyl-tris(3,3',5,5'-tetra-t-butyl-1,1'-biphenyl-2,2'-diyl) phosphite, 6-[3-(3-t-butyl-4-hydroxy-5-methylphenyl) propoxy]-2,4,8,10-tetra-t-butyldibenz[d,f][1,3,2] dioxaphosphepin and any mixtures thereof.

Examples of the anti-aging agent include, for example, quinoline-based anti-aging agents such as a polymer of 2,2,4-trimethyl-1,2-dihydroquinoline; monophenol-based anti-aging agents such as 2,6-di-t-butyl-4-methylphenol and styrenated phenol; and bis-, tris-, and polyphenol-based anti-aging agents such as tetrakis-[methylene-3-(3',5'-di-t-butyl-4'-hydroxyphenyl)propionate]methane. These may be used alone or in combination of two or more types. Of these, quinoline-based anti-aging agents are preferred.

Examples of the ultraviolet absorber include the followings. As the ultraviolet absorber, the following compounds may be used alone, or two or more of them may be used in combination.

(1) Examples of Salicylate Derivatives

Phenyl salicylate, 4-t-butylphenyl salicylate, 2,4-di-t-butylphenyl 3',5'-di-t-butyl-4'-hydroxybenzoate, 4-t-octylphenyl salicylate, bis(4-t-butylbenzoyl)resorcinol, benzoyl resorcinol, hesadecyl 3',5'-di-t-butyl-4'-hydroxybenzoate, octadecyl 3',5'-di-t-butyl-4'-hydroxybenzoate, 2-methyl-4,6-di-t-butylphenyl 3',5'-di-t-butyl-4'-hydroxybenzoate and any mixtures thereof.

(2) Examples of 2-hydroxybenzophenone Derivatives 2,4-Dihydroxybenzophenone, 2-hydroxy-4-methoxybenzophenone, 2-hydroxy-4-octoxybenzophenone, 2,2'-dihydroxy-4-methoxybenzophenone, bis(5-benzoyl-4-hydroxy-2-methoxyphenyl)methane, 2,2',4,4'-tetrahydroxybenzophenone and any mixtures thereof.

(3) Examples of 2-(2'-hydroxyphenyl)benzotriazole 2-(2'-hydroxy-5-methylphenyl)benzotriazole, 2-(3',5'-di-t-butyl-2'-hydroxyphenyl)benzotriazole, 2-(5'-t-butyl-2'-hydroxyphenyl)benzotriazole, 2-(2'-hydroxy-5'-t-octylphenyl) benzotriazole, 2-(3-t-butyl-2-hydroxy-5-methylphenyl)-5-chlorobenzotriazole, 2-(3'-s-butyl-2'-hydroxy-5'-t-butylphenyl)benzotriazole, 2-(2'-hydroxy-4'-octyloxyphenyl)benzotriazole, 2-(3',5'-di-t-amyl-2'-hydroxyphenyl)benzotriazole, 2-[2'-hydroxy-3',3'-bis(α,α-dimethylbenzyl)phenyl]-2H-benzotriazole, 2-[(3'-t-butyl-2'-hydroxyphenyl)-5'-(2-octyloxycarbonylethyl)phenyl]-5-chlorobenzotriazole, 2-[3'-t-butyl-5'-[2-(2-ethylhexyloxy) carbonylethyl]-2'-hydroxyphenyl]-5-chlorobenzotriazole, 2-[3'-t-butyl-3'-hydroxy-5'-(2-methoxycarbonylethyl)phenyl]-5-chlorobenzotriazole, 2-[3'-t-butyl-2'-hydroxy-5'-(2-methoxycarbonylethyl)phenyl]benzotriazole, 2-[3'-t-butyl-2'-hydroxy-5-(2-octyloxycarbonylethyl)phenyl] benzotriazole, 2-[3'-t-butyl-2'-hydroxy-5'-[2-(2-ethylhexyloxy)carbonylethyl]phenyl]benzotriazole, 2-[2-hydroxy-3-(3,4,5,6-tetrahydrophthalimidomethyl)-5-methylphenyl]benzotriazole, 2-(3,5-di-t-butyl-2-hydroxyphenyl)-5-chlorobenzotriazole, a mixture of 2-(3'-dodecyl-2'-hydroxy-5'-methylphenyl)benzotriazole and 2-[3'-t-butyl-2'-hydroxy-5'-(2-isooctyloxycarbonylethyl) phenyl]benzotriazole, 2,2'-methylenebis[6-(2H-benzotriazol-2-yl)-4-(1,1,3,3-tetramethylbutyl)phenol, 2,2'-methylenebis[4-t-butyl-6-(2H-benzotriazol-2-yl) phenol], a condensate of poly(3-11)(ethyleneglycol) with 2-[3'-t-butyl-2'-hydroxy-5'-(2-methoxycarbonylethyl)phenyl]benzotriazole, a condensate of poly(3-11)(ethyleneglycol) with methyl 3-[3-(2H-benzotriazol-2-yl)-5-t-butyl-4-hydroxyphenyl] propionate, 2-ethylhexyl 3-[3-t-butyl-5-(5-chloro-2H-benzotriazol-2-yl)-4-hydroxyphenyl]propionate, octyl 3-[3-t-butyl-5-(5-chloro-2H-benzotriazol-2-yl)-4-hydroxyphenyl] propionate, methyl 3-[3-t-butyl-5-(5-chloro-2H-benzotriazol-2-yl)-4-hydroxyphenyl]propionate, 3-[3-t-butyl-5-(5-chloro-2H-benzotriazol-2-yl)-4-hydroxyphenyl] propionic acid and any mixtures thereof.

As the light stabilizer, for example, the following can be mentioned. As the light stabilizer, the following compounds may be used alone or in combination of two or more.

(1) Examples of Hindered Amine Light Stabilizers

Bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(N-octoxy-2,2,6,6-tetramethyl-4-piperidyl)sebacate, bis(N-benzyloxy-2,2,6,6-tetramethyl-4-piperidyl)sebacate, bis(N-cyclohexyloxy-2,2,6,6-tetramethyl-4-piperidyl)sebacate, bis1,2,2,6,6-pentamethyl-4-piperidyl) 2-(3,5-di-t-butyl-4-hydroxybenzyl)-2-butylmalonate, bis(1-acroyl-2,2,6,6-tetramethyl-4-piperidyl) 2,2-bis(3,5-di-t-butyl-4-hydroxybenzyl)-2-butylmalonate, bis(1,2,2,6,6-pentamethyl-4-piperidyl) decanedioate, 2,2,6,6-tetramethyl-4-piperidyl methacrylate, 4-[3-(3,5-di-t-butyl-4-hydroxyphenyl)propionyloxy]-1-[2-(3-(3,5-di-t-butyl-4-hydroxyphenyl)propionyloxy)ethyl]-2,2,6,6-tetramethylpiperidine, 2-methyl-2-(2,2,6,6-tetramethyl-4-piperidyl)amino-N-(2,2,6,6-tetramethyl-4-piperidyl) propionamide, tetrakis(2,2,6,6-tetramethyl-4-piperidyl) 1,2,3,4-butanetetracarboxylate, tetrakis(1,2,2,6,6-pentamethyl-4-piperidyl) 1,2,3,4-butanetetracarboxylate, a mixed esterified product of 1,2,3,4-butanetetracarboxylic acid with 1,2,2,6,6-pentamethyl-4-piperidinol and 1-tridecanol, a mixed esterified product of 1,2,3,4-butanetetracarboxylic acid with 2,2,6,6-tetramethyl-4-piperidinol and 1-tridecanol, a mixed esterified product of 1,2,3,4-butanetetracarboxylic acid with 1,2,2,6,6-pentamethyl-4-piperidinol and 3,9-bis(2-hydroxy-1,1-dimethylethyl)-2,4,8,10-tetraoxaspiro[5.5]undecane, a mixed esterified product of 1,2,3,4-butanetetracarboxylic acid with 2,2,6,6-tetramethyl-4-piperidinol and 3,9-bis(2-hydroxy-1,1-dimethylethyl)-2,4,8,10-tetraoxaspiro [5.5]undecane, a polycondensate of dimethyl succinate with 1-(2-hydroxyethyl)-4-hydroxy-2,2,6,6-tetramethylpiperidine, poly[(6-morpholino-1,3,5-triazine-2,4-diyl)((2,2,6,6-tetramethyl-4-piperidyl)imino)hexamethylene((2,2,6,6-tetramethyl-4-piperidyl)imino)], poly[(6-(1,1,3,3-tetramethylbutyl)imino-1,3,5-triazine-2,4-diyl((2,2,6,6-tetramethyl-4-piperidyl)imino)hexamethylene((2,2,6,6-tetramethyl-4-piperidyl)imino)], a polycondensate of N,N'-bis(2,2,6,6-tetramethyl-4-piperidyl)hexamethylenediamine with 1,2-dibromoethane, N,N',4,7-tetrakis[4,6-bis(N-butyl-N-(2,2,6,6-tetramethyl-4-piperidyl)amino)-1,3,5-triazine-2-yl]-4,7-diazadecane-1,10 diamine, N,N',4-tris[4,6-bis(N-butyl-N-(2,2,6,6-tetramethyl-4-piperidyl)amino)-1,3,5-triazin-2-yl]-4,7-diazadecane-1,10-diamine, N,N',4,7-tetrakis[4,6-bis(N-butyl-N-(1,2,2,6,6-pentamethyl-4-piperidyl)amino)-1,3,5-triazin-2-yl]-4,7-diazadecane-1,10-diamine, N,N',4-tris[4,6-bis(N-butyl-N-(1,2,2,6,6-pentamethyl-4-piperidyl) amino)-1,3,5-triazin-2-yl]-4,7-diazadecane-1,10-diamine and any mixtures thereof.

(2) Examples of Acrylate-Based Light Stabilizers

Ethyl α-cyano-β,β-diphenyl acrylate, isooctyl α-cyano-β,β-diphenyl acrylate, methyl α-carbomethoxycinnamate, methyl α-cyano-β-methyl-p-methoxycinnamate, butyl α-cyano-β-methyl-p-methoxycinnamate, methyl α-carbomethoxy-p-methoxycinnamate and N-(β-carbomethoxy-β-cyanovinyl)-2-methylindoline and any mixtures thereof.

(3) Examples of Nickel-Based Light Stabilizers

Nickel complexes of 2,2'-thiobis-[4-(1,1,3,3-tetramethylbutyl)phenol], nickeldibutyldithiocarbamate, nickel salts of monoalkyl esters, nickel complexes of ketoximes and any mixtures thereof.

(4) Examples of Oxamide-Based Light Stabilizers 4,4'-dioctyloxyoxanilide, 2,2'-diethoxyoxanilide, 2,2'-dioctyloxy-5,5'-di-t-butylanilide, 2,2'-didodecyloxy-5,5'-di-t-butylanilide, 2-ethoxy-2'-ethyloxanilide, N,N'-bis(3-dimethylaminopropyl)oxamide, 2-ethoxy-5-t-butyl-2'-ethoxyanilide, 2-ethoxy-5,4'-di-t-butyl-2'-ethyloxanilide and any mixtures thereof.

(5) Examples of 2-(2-hydroxyphenyl)-1,3,5-triazine Light Stabilizers 2,4,6-Tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-[2,4-dihydroxyphenyl-4,6-bis(2,4-dimethylphenyl]-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethylphenyl)-1,3,5-triazine, 2-[2-hydroxy-4-(2-hydroxy-3-octyloxypropoxy)phenyl]-4,6-bis(2,4-dimethylphenyl)-1,3,5-triazine and any mixtures thereof.

Examples of the metal deactivator include the followings.

N,N'-diphenyloxamide, N-salicylal-N'-salicyloylhydrazine, N,N'-bis(salicyloyl)hydrazine, N,N'-bis(3,5-di-t-butyl-4-hydroxyphenylpropionyl)hydrazine, 3-salicyloylamino-1,2,4-triazole, bis(benzylidene)oxalyldihydrazide, oxanilide, isophthaloyldihydrazide, sebacoylbisphenylhydrazide, N,N'-bis(salicyloyl)oxalyldihydrazide, N,N'-bis(salicyloyl) thiopropionyldihydrazide and any mixtures thereof.

Examples of the peroxide scavenger include esters of B-thiodipropionic acid, mercaptobenzimidazole, zinc salt of 2-mercaptobenzimidazole, zinc salt of dibutyldithiocarbamic acid, dioctadecyl disulfide, pentaerythritol tetrakis(β-dodecylmercapto)propionate, and any mixtures thereof.

Examples of the polyamide stabilizer include copper or divalent manganese salt of iodide or phosphorus compound, and any mixtures thereof.

Examples of the hydroxyamine include N,N-dibenzylhydroxyamine, N,N-diethylhydroxyamine, N,N-dioctylhydroxyamine, N,N-dilaurylhydroxyamine, N,N-ditetradecylhydroxylamine, N,N-dihexadecylhydroxyamine, N,N-dioctadecylhydroxyamine, N-hexadecyl-N-octadecylhydroxyamine, N-heptadecyl-N-octadecylhydroxyamine and any mixtures thereof.

Examples of the neutralizing agent include calcium stearate, zinc stearate, magnesium stearate, hydrotalcite (basic magnesium aluminum hydroxy carbonate hydrate), melamine, amine, polyamide, polyurethane, and any mixtures thereof.

Examples of the lubricant include aliphatic hydrocarbons such as paraffin and wax, higher fatty acids having 8 to 22 carbon atoms, higher fatty acid metal (Al, Ca, Mg, Zn) salts having 8 to 22 carbon atoms, aliphatic alcohols having 8 to 22 carbon atoms, polyglycols, esters of a higher fatty acid having 4 to 22 carbon atoms with an aliphatic monohydric alcohol having 4 to 18 carbon atoms, higher aliphatic amides having 8 to 22 carbon atoms, silicone oils, rosin derivatives.

Examples of the nucleating agent include the followings. Sodium 2,2'-methylenebis(4,6-di-t-butylphenyl)phosphate, [phosphate-2,2'-methylenebis(4,6-di-t-butylphenyl)]dihydroxyaluminum, bis[phosphate-2,2'-methylenebis(4,6-di-t-butylphenyl)]hydrooxyaluminum, tris[phosphate-2,2'-methylenebis(4,6-di-t-butylphenyl)]aluminum, sodium bis(4-t-butylphenyl)phosphate, metal salts of benzoic acid such as sodium benzoate, aluminum p-t-butylbenzoate, 1,3:2,4-bis (O-benzylidene)sorbitol, 1,3:2,4-bis(O-methylbenzylidene) sorbitol, 1,3:2,4-bis(O-ethylbenzylidene)sorbitol, 1,3-O-3,4-dimethylbenzylidene-2,4-O-benzylidene sorbitol, 1,3-O-benzylidene-2,4-O-3,4-dimethylbenzylidene sorbitol, 1,3:2,4-bis(O)-3,4-dimethylbenzylidene)sorbitol, 1,3-O-p-chlorobenzylidene-2,4-O-3,4-dimethylbenzylidenesorbitol, 1,3-O-3,4-dimethylbenzylidene-2,4-O-p-chlorobenzylidenesorbitol, 1,3:2,4-bis(O-p-chlorobenzylidene)sorbitol and any mixtures thereof.

Examples of the filler include calcium carbonate, silicate, glass fiber, asbestos, talc, kaolin, mica, barium sulfate, carbon black, carbon fiber, zeolite, and any mixtures thereof.

Among these additives, preferred are phenolic antioxidants, phosphorus antioxidants, ultraviolet absorbers, hindered amine light stabilizers, peroxide scavengers and neutralizing agents.

Examples of particularly preferred phenolic antioxidant include the following compounds.

2,6-Di-t-butyl-4-methylphenol, 2,4,6-tri-t-butylphenol, 2,4-dioctylthiomethyl-6-methylphenol, 2,2'-thiobis(6-t-butylphenol), 4,4'-thiobis(3-methyl-6-t-butylphenol), 2,2'-methylenebis(4-methyl-6-t-butylphenol), 2,2'-methylenebis (4-ethyl-6-t-butylphenol), 2,2'-methylenebis[4-methyl-6-(α-methylcyclohexyl)phenol]], 2,2'-methylenebis(4-methyl-6-cyclohexylphenol), 2,2'-methylenebis(4,6-di-t-butylphenol), 2,2'-ethylidenebis(4,6-di-t-butylphenol), 4,4'-methylenebis (6-t-butyl-2-methylphenol), 4,4'-methylenebis(2,6-di-t-butylphenol), 4,4'-butylidenebis(3-methyl-6-t-butylphenol), 1,1-bis(4-hydroxyphenyl)cyclohexane, 1,1-bis(5-t-butyl-4-hydroxy-2-methylphenyl)butane, 1,1,3-tris(5-t-4-hydroxy-2-methylphenyl)butane, ethylene glycol bis[3,3-bis-3'-t-butyl-4'-hydroxyphenyl)butyrate], 2-t-butyl-6-(3'-t-butyl-5'-methyl-2'-hydroxybenzyl)-4-methylphenylacrylate, 2,4-di-t-pentyl-6-[1-2-hydroxy-3,5-di-t-pentylphenyl)ethyl] phenylacrylate, 2,4,6-tris(3,5-di-t-butyl-4-phenoxy)-1,3,5-triazine, tris(4-t-butyl-3-hydroxy-2,6-dimethylbenzyl)isocyanurate, bis(3,5-di-t-butyl-4-hydroxybenzyl)isocyanurate, tris [2-(3',5'-di-t-butyl-4'-hydroxycinnamoyloxy)ethyl]isocyanurate, diethyl-3,5-di-t-butyl-4-hydroxybenzylphosphonate, di-n-octadecyl-3,5-di-t-butyl-4-hydroxybenzylphosphonate, calcium salt of 3,5-di-t-butyl-4-hydroxybenzylphosphonic acid monoester, n-octadecyl 3-(3,5-di-t-butyl-4-hydroxyphenyl)propionate, neopentane tetrayltetrakis(3,5-di-t-butyl-4-hydroxycinnamate), thiodiethylenebis(3,5-di-t-butyl-4-hydroxycinnamate), 1,3,5-trimethyl-2,4,6-tris(3,5-di-t-butyl-4-hydroxybenzyl)benzene, 3,6-dioxaoctamethylenebis(3,5-di-t-butyl-4-hydroxycinnamate), hexamethylenebis(3,5-di-t-butyl-4-hydroxycinnamate), triethyleneglycolbis(5-t-butyl-4-hydroxy-3-methylcinnamate), N,N'-bis[3-(3',5'-di-t-butyl-4'-hydroxyphenyl)propionyl]hydrazine, N,N'-bis [3-(3',5'-di-t-butyl-4'-hydroxyphenyl)propionyl] hexamethylenediamine and the like.

Examples of particularly preferable phosphorus antioxidants include the following compounds.

Tris(nonylphenyl)phosphite, tris(2,4-di-t-butylphenyl) phosphite, distearylpentaerythritoldiphosphite, bis(2,4-di-t-butylphenyl)pentaerythritoldiphosphite, bis(2,4-di-t-butyl-6-methylphenyl)pentaerythritoldiphosphite, bis(2,6-di-t-butyl-4-methylphenyl)pentaerythritoldiphosphite, tetrakis (2,4-di-t-butylphenyl)-4,4'-diphenylenediphosphonite, 2,2'-methylenebis(4,6-di-t-butylphenyl) 2-ethylhexylphosphite, 2,2'-ethylidenebis(4,6-di-t-butylphenyl)fluorophosphite, bis (2,4-di-t-butyl-6-methylphenyl)ethylphosphite, 2-(2,4,6-tri-t-butylphenyl)-5-ethyl-5-butyl-1,3,2-oxaphosphorinane, 2,2',2"-nitrilo[triethyl-tris(3,3',5,5'-tetra-t-butyl-1,1'-biphenyl-2,2'-diyl)phosphite, 6-[3-(3-t-butyl-4-hydroxy-5-methylphenyl)propoxy]-2,4,8,10-tetra-t-butyldibenz[d,f][1,3,2] dioxaphosphepin and the like.

Examples of particularly preferred ultraviolet absorbers include the following compounds.

Phenyl salicylate, 4-t-butylphenylsalicylate, 2,4-di-t-butylphenyl 3',5'-di-t-butyl-4'-hydroxybenzoate, 4-t-octylphenylsalicylate, 2,4-dihydroxybenzophenone, 2-hydroxy-4-methoxybenzophenone, 2-hydroxy-4-octoxybenzophenone, 2,2'-dihydroxy-4-methoxybenzophenone, bis(5-benzoyl-4-hydroxy-2-methoxyphenyl)methane, 2,2',4,4'-tetrahydroxybenzophenone, 2-(2-hydroxy-5-methylphenyl) benzotriazole, 2-(3',5'-di-t-butyl-2'-hydroxyphenyl) benzotriazole, 2-(5'-t-butyl-2'-hydroxyphenyl) benzotriazole, 2-(2'-hydroxy-5'-t-octylphenyl)benzotriazole, 2-(3-t-butyl-2-hydroxy-5-methylphenyl)-5-chlorobenzotriazole, 2-(3'-S-butyl-2'-hydroxy-5'-t-butylphenyl)benzotriazole, 2-(2'-hydroxy-4'-octyloxyphenyl)benzotriazole, 2-(3',5'-di-t-amyl-2'-hydroxyphenyl)benzotriazole, 2-[2'-hydroxy-3',5'-bis(α,α-dimethylbenzyl)phenyl]-2H-benzotriazole and the like.

Examples of particularly preferable light stabilizers include the following compounds.

Bis(2,2,6,6-tetramethyl-4-piperidyl)sebacate, bis(1,2,2,6,6-pentamethyl-4-piperidyl)sebacate, bis(N-octoxy-2,2,6,6-tetramethyl-4-piperidyl)sebacate, bis(N-benzyloxy-2,2,6,6-tetramethyl-4-piperidyl)sebacate, bis(N-cyclohexyloxy-2,2,6,6-tetramethyl-4-piperidyl)sebacate, bis(1,2,2,6,6-pentamethyl-4-piperidyl) 2-(3,5-di-t-butyl-4-hydroxybenzyl)-2-butylmalonate, bis(1-acroyl-2,2,6,6-tetramethyl-4-piperidyl) 2,2-bis(3,5-di-t-butyl-4-hydroxybenzyl)-2-butylmalonate, bis(2,2,6,6-tetramethyl-4-piperidyl)succinate, 2,2,6,6-tetramethyl-4-piperidylmethacrylate, 4-[3-(3,5-di-t-butyl-4-hydroxyphenyl)propionyloxy]-1-[2-(3-(3,5-di-t-butyl-4-hydroxyphenyl)propionyloxy)ethyl]-2,2,6,6-tetramethylpiperidine, 2-methyl-2-(2,2,6,6-tetramethyl-4-piperidyl)amino-N-(2,2,6,6-tetramethyl-4-piperidyl) propionamide, tetrakis(2,2,6,6-tetramethyl-4-piperidyl) 1,2,3,4-butanetetracarboxylate, tetrakis(1,2,6,6-pentamethyl-4-piperidyl) 1,2,3,4-butanetetracarboxylate, a mixed esterified product of 1,2,3,4-butanetetracarboxylic acid with 1,2,2,6,6-pentamethyl-4-piperidinol and 1-tridecanol, a mixed esterified product of 1,2,3,4-butanetetracarboxylic acid with 2,2,6,6-tetramethyl-4-piperidinol and 1-tridecanol, a mixed esterified product of 1,2,3,4-butanetetracarboxylic acid with 1,2,2,6,6-pentamethyl-4-piperidinol and 3,9-bis (2-hydroxy-1,1-dimethylethyl)-2,4,8,10-tetraoxaspiro [5.5]undecane, a mixed esterified product of 1,2,3,4-butanetetracarboxylic acid with 2,2,6,6-tetramethyl-4-piperidinol and 3,9-bis(2-hydroxy-1,1-dimethylethyl)-2,4,8,10-tetraoxaspiro[5.5]undecane, a polycondensate of dimethyl succinate with 1-(2-hydroxyethyl)-4-hydroxy-2,2,6,6-tetramethylpiperidine, poly[(6-morpholino-1,3,5-triazine-2,4-diyl)((2,2,6,6-tetramethyl-4-piperidyl)imino)hexamethylene((2,2,6,6-tetramethyl-4-piperidyl)imino)], poly[(6-(1,1,3,3-tetramethylbutyl)-1,3,5-triazine-2,4-diyl)((2,2,6,6-tetramethyl-4-piperidyl)imino)hexamethylene((2,2,6,6-tetramethyl-4-piperidyl)imino)] and the like.

The process stabilizer of the present invention or the specific amount ratio of the compound (I) represented by Formula (I), the compound (II) represented by Formula (II) and the amine compound (A), and other additives to be added as required can be added to an organic material using any known method and apparatus for obtaining a homogeneous mixture. For example, in the case that the process stabilizer of the present invention is added, when the organic material is a solid polymer, the process stabilizer of the present invention and/or the other additives to be added as required may be directly dry-blended with the solid polymer, or the process stabilizer and/or the other additives to be added as required may be added to the solid polymer in the form of a masterbatch. When the organic material is a liquid polymer, in addition to the above-described addition method, the process stabilizer of the present invention and/or the other additives to be added as required may be, in the form of a solution or a dispersion, blended into the polymer solution during or immediately after polymerization. Meanwhile, when the organic material is a liquid (e.g., oil) other than a solid polymer, in addition to the above-described addition method, the process stabilizer of the present invention and/or the other additives to be added as required may be directly added to and dissolved in the organic material, or the process stabilizer of the present invention and/or the other additives to be added as required may be added in a state of being dissolved or suspended in a liquid medium.

The process stabilizer of the present invention exhibits excellent performance as a stabilizer of various organic materials including thermoplastic resins such as polyolefins. An organic material to which the process stabilizer of the present invention is added and an organic material to which the specific amount ratio of the compound (I) represented by Formula (I), the compound (II) represented by Formula (II)

and the amine compound (A) are added are stable against thermal deterioration, oxidative deterioration, and the like during its production, processing, and use, and yields a high-quality product. Furthermore, the discoloration caused by an oxidizing gas can be prevented.

EXAMPLES

The present invention will now be described more concretely by way of Examples and Comparative Examples; however, the present invention is not limited thereto by any means. In the below-described Examples and Comparative Examples, unless otherwise specified, "part(s)" means "part (s) by mass".

Components

Components used in Examples and Comparative Examples are as follows.

Thermoplastic Resin

Low-density polyethylene resin (LLDPE) (MI value: 1 g/10 min, manufactured by Sumitomo Chemical Co., Ltd.)

Process Stabilizer

Compound I:
2,4,8,10-tetra-t-butyl-6-[3-(3-methyl-4-hydroxy-5-t-butylphenyl)propoxy]dibenzo[d,f][1,3,2]dioxaphosphepin (SUMILIZER (registered trademark) GP, manufactured by Sumitomo Chemical Co., Ltd.)
Compound II:
6-oxo-2,4,8,10-tetra-t-butyl-dibenzo[d,f][1,3,2]dioxaphosphepin
Amine compound A:
triisopropanolamine (manufactured by Tokyo Chemical Industry Co., Ltd.)

Production of Compound II

First, 60 g of 2,2'-bis(4,6-di-t-butylphenol) and 770 mL of n-pentane were mixed, and 23 g of phosphorus trichloride was added dropwise thereto. While cooling the resultant in an ice bath, 49 g of triethylamine was further added dropwise, followed by 6-hour stirring at room temperature. To the resulting mixture, 2.6 g of water was added, and this mixture was stirred at room temperature for 2 hours. Water and ethyl acetate were added to the thus obtained mixture, and an ethyl acetate layer was separated and then washed with saturated saline. The thus washed ethyl acetate layer was dried over anhydrous magnesium sulfate, and ethyl acetate was removed by distillation to obtain a solid. The thus obtained solid was mixed with diethyl ether, and the resulting mixture was subsequently filtered to obtain a white solid. The thus obtained white solid was dissolved in a mixed solvent of hexane and ethyl acetate, after which the resultant was filtered, and hexane and ethyl acetate were removed from the resulting filtrate by distillation, whereby a compound II was obtained. The yield was 61.8%.

By mass spectrometry and $^{1}H$-NMR, the thus obtained compound II was confirmed to be 6-oxo-2,4,8,10-tetra-t-butyl-dibenzo[d,f][1,3,2]dioxaphosphepin.

Example 1

The LLDPE in an amount of 100 parts was dry-blended with 0.05 parts of calcium stearate (manufactured by Nitto Kasei Co., Ltd.), 0.2 parts of the compound I, 0.00006 parts of the compound II, and 0.002 parts of the amine compound A, and the thus obtained mixture was kneaded using a twin-screw extruder having a cylinder diameter of 32 mm (BTN-32, manufactured by PLABOR Research Laboratory of Plastics Technology Co., Ltd.) in a nitrogen atmosphere at a temperature of 190 °C and a screw rotation speed of 80 rpm to obtain pellets.

Examples 2 to 7 and Comparative Examples 1 to 5

Pellets were obtained in the same manner as in Example 1, except that the compound I, the compound II, and the amine compound A were dry-blended in the respective added amounts (parts by weight) shown in Table 1.

Using the thus obtained pellets of Examples 1 to 7 and Comparative Examples 1 to 5, the process stability and the resistance to NOx were evaluated.

Process Stability

An operation of kneading the above-obtained pellets using a single-screw extruder having a cylinder diameter of 30 mm (VS30-28 extruder, manufactured by Tanabe Plastics Machinery Co., Lid.) in an air atmosphere at a temperature of 280 °C and a screw rotation speed of 50 rpm and thereby obtaining pellets was repeated 5 times, and the melt flow rate (MFR) of the thus obtained pellets was measured.

The MFR was measured using a melt indexer (model: L246-3537, manufactured by Technol Seven Co., Ltd.) at a temperature of 190 °C with a load of 21.18 N. A processing with heat causes crosslinking of the LLDPE to proceed, and this leads to a reduction in the MFR of the LLDPE. Therefore, the higher the MFR of the pellets after the repeated extrusion by the single-screw extruder, the better is the process stability of the LLDPE. Based on the thus measured MFR, the process stability was evaluated by the following criteria. The results thereof are shown in Table 2.

Evaluation Criteria of Process Stability

○: 0.6 or higher
x: lower than 0.6

Resistance to NOx

The above-obtained pellets were pressed using a press machine ("PEW-5040", manufactured by Kansai Roll Co., Ltd.) at a temperature of 190 °C to obtain a 1 mm-thick sheet. The thus obtained sheet was cut into a size of 4 cm in length×4 cm in width using a lever-controlled sample cutter ("SDL-200", manufactured by Dumbbell Co., Ltd.) to obtain a test piece.

The thus obtained test piece was suspended in a nitrogen oxide gas tester ("GF-5", manufactured by Suga Test Instruments Co., Ltd.), and NOx gas generated in accordance with JIS L0855 (1998) was collected in a gas burette, after which 10 mL of the thus collected NOx gas was injected into the nitrogen oxide gas tester using a gas syringe. After exposing the test piece to the injected NOx gas for 7 days under room temperature, the test piece was taken out, and the yellow index (YI) was measured using a colorimeter ("CM-3500d", manufactured by Konica Minolta Japan, Inc.). A smaller YI value means a further inhibition of discoloration and a superior resistance to NOx. Based on the thus measured YI, the resistance to NOx was evaluated by the following criteria. The results thereof are shown in Table 2.

Evaluation Criteria of Resistance to NOx

○: less than 5.9
x: 5.9 or more $R^3$s each independently represent a hydrogen atom or an alkyl group having 1 to 8 carbon atoms, X represents a single bond, a sulfur atom, or a —CH(—$R^6$)— group (wherein, $R^6$ represents a hydrogen atom, an alkyl group having 1 to 8 carbon atoms, or a cycloalkyl group having 5 to 8 carbon atoms),

TABLE 1

| | | Process stabilizer: added amount (parts by weight) | | | Process stabilizer: added weight ratio | | |
|---|---|---|---|---|---|---|---|
| | | Compound I | Compound II | Amine compound A | Compound I | Compound II | Amine compound A |
| Example | 1 | 0.2 | 0.00006 | 0.002 | 100 | 0.03 | 1 |
| | 2 | 0.2 | 0.00006 | 0.01 | 100 | 0.03 | 5 |
| | 3 | 0.2 | 0.00006 | 0.02 | 100 | 0.03 | 10 |
| | 4 | 0.2 | 0.00002 | 0.002 | 100 | 0.01 | 1 |
| | 5 | 0.2 | 0.0001 | 0.002 | 100 | 0.05 | 1 |
| | 6 | 0.2 | 0.0002 | 0.002 | 100 | 0.1 | 1 |
| | 7 | 0.2 | 0.002 | 0.002 | 100 | 1 | 1 |
| Comparative | 1 | 0 | 0 | 0 | 0 | 0 | 0 |
| Example | 2 | 0.2 | 0.00006 | 0 | 100 | 0.03 | 0 |
| | 3 | 0.2 | 0.00006 | 0.05 | 100 | 0.03 | 25 |
| | 4 | 0.2 | 0 | 0.002 | 100 | 0 | 1 |
| | 5 | 0.2 | 0.01 | 0.002 | 100 | 5 | 1 |

TABLE 2

| | | Process stability | | Resistance to NO*x* | |
|---|---|---|---|---|---|
| | | MFR | Evaluation | YI | Evaluation |
| Example | 1 | 0.90 | ○ | 5.4 | ○ |
| | 2 | 0.93 | ○ | 5.7 | ○ |
| | 3 | 0.93 | ○ | 5.7 | ○ |
| | 4 | 0.83 | ○ | 5.5 | ○ |
| | 5 | 0.79 | ○ | 4.8 | ○ |
| | 6 | 0.76 | ○ | 4.9 | ○ |
| | 7 | 0.75 | ○ | 5.1 | ○ |
| Comparative | 1 | 0.10 | x | 1.6 | ○ |
| Example | 2 | 0.87 | ○ | 6.1 | x |
| | 3 | 1.16 | ○ | 6.8 | x |
| | 4 | 0.87 | ○ | 6.1 | x |
| | 5 | 0.75 | ○ | 5.9 | x |

The invention claimed is:

1. A process stabilizer, comprising:

a compound (I) represented by Formula (I):

(I)

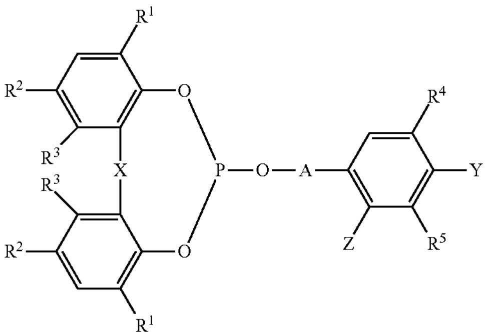

[in Formula (I), $R^1$, $R^2$, $R^4$, and $R^5$ each independently represent a hydrogen atom, an alkyl group having 1 to 8 carbon atoms, a cycloalkyl group having 5 to 8 carbon atoms, an alkylcycloalkyl group having 6 to 12 carbon atoms, an aralkyl group having 7 to 12 carbon atoms, or a phenyl group, A represents an alkylene group having 1 to 8 carbon atoms or a *—C(═O)—$R^7$— group (wherein, $R^7$ represents a single bond or an alkylene group having 1 to 8 carbon atoms, and * represents a bond on the oxygen side), and one of Y and Z represents a hydroxyl group, an alkoxy group having 1 to 8 carbon atoms, or an aralkyloxy group having 7 to 12 carbon atoms, while the other represents a hydrogen atom or an alkyl group having 1 to 8 carbon atoms];

a compound (II) represented by Formula (II):

(II)

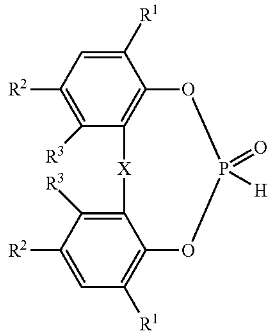

[in Formula (II), $R^1$ and $R^2$ each independently represent a hydrogen atom, an alkyl group having 1 to 8 carbon atoms, a cycloalkyl group having 5 to 8 carbon atoms, an alkylcycloalkyl group having 6 to 12 carbon atoms, an aralkyl group having 7 to 12 carbon atoms, or a phenyl group, $R^3$s each independently represent a hydrogen atom or an alkyl group having 1 to 8 carbon atoms, and X represents a single bond, a sulfur atom, or a —CH(—$R^6$)— group (wherein, $R^6$ represents a hydrogen atom, an alkyl group having 1 to 8 carbon atoms, or a cycloalkyl group having 5 to 8 carbon atoms)]; and an amine compound (A) having a hydroxyalkyl group, wherein, with respect to 100 parts by mass of the compound (I), the content of the compound (II) is 0.005 to 4 parts by mass, and the content of the amine compound (A) is 0.01 to 15 parts by mass.

2. The process stabilizer according to claim 1, wherein the amine compound (A) is an alkanolamine.

3. The process stabilizer according to claim 2, wherein the alkanolamine is represented by Formula (III):

(III)

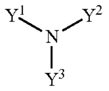

[in Formula (III), $Y^1$, $Y^2$, and Y3 each independently represent a hydrogen atom, an alkyl group having 1 to 8 carbon atoms, or an alkyl group having 1 to 8 carbon atoms and at least one hydroxy group, provided that at least one of $Y^1$ to $Y^3$ represents an alkyl group having 1 to 8 carbon atoms and at least one hydroxy group], or Formula (IV):

(IV)

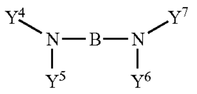

[in Formula (IV), $Y^4$, $Y^5$, $Y^6$, and Y7 each independently represent a hydrogen atom, an alkyl group having 1 to 8 carbon atoms, or an alkyl group having 1 to 8 carbon atoms and at least one hydroxy group, provided that at least one of $Y^4$ to $Y^7$ represents an alkyl group having 1 to 8 carbon atoms and at least one hydroxy group, and B represents an alkylene group having 1 to 4 carbon atoms].

4. The process stabilizer according to claim 3, wherein the alkanolamine is represented by Formula (III).

5. The process stabilizer according to claim 3, wherein $Y^1$, $Y^2$, and Y3 in Formula (III), and $Y^4$, $Y^5$, $Y^6$, and $Y^7$ in Formula (IV) each independently represent —$CH_2$—CH(OH)—$R^6$ [wherein, $R^6$ represents a hydrogen atom or an alkyl group having 1 to 3 carbon atoms].

6. An organic material composition, comprising:

a compound (I) represented by Formula (I):

(I)

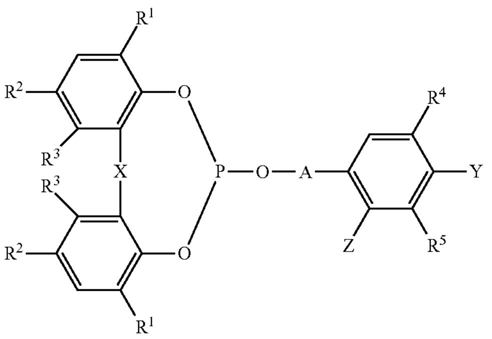

[in Formula (I), $R^1$, $R^2$, $R^4$, and $R^5$ each independently represent a hydrogen atom, an alkyl group having 1 to 8 carbon atoms, a cycloalkyl group having 5 to 8 carbon atoms, an alkylcycloalkyl group having 6 to 12 carbon atoms, an aralkyl group having 7 to 12 carbon atoms, or a phenyl group, $R^3$s each independently represent a hydrogen atom or an alkyl group having 1 to 8 carbon atoms, X represents a single bond, a sulfur atom, or a —CH(—$R^6$)— group (wherein, $R^6$ represents a hydrogen atom, an alkyl group having 1 to 8 carbon atoms, or a cycloalkyl group having 5 to 8 carbon atoms), A represents an alkylene group having 1 to 8 carbon atoms or a *—C(═O)—$R^7$— group (wherein, $R^7$ represents a single bond or an alkylene group having 1 to 8 carbon atoms, and * represents a bond on the oxygen side), and one of Y and Z represents a hydroxyl group, an alkoxy group having 1 to 8 carbon atoms, or an aralkyloxy group having 7 to 12 carbon atoms, while the other represents a hydrogen atom or an alkyl group having 1 to 8 carbon atoms];

a compound (II) represented by Formula (II):

(II)

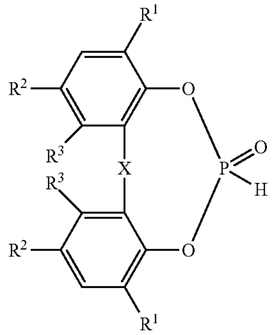

[in Formula (II), $R^1$ and $R^2$ each independently represent a hydrogen atom, an alkyl group having 1 to 8 carbon atoms, a cycloalkyl group having 5 to 8 carbon atoms, an alkylcycloalkyl group having 6 to 12 carbon atoms, an aralkyl group having 7 to 12 carbon atoms, or a phenyl group, R3s each independently represent a hydrogen atom or an alkyl group having 1 to 8 carbon atoms, and X represents a single bond, a sulfur atom, or a —CH(—$R^6$)— group (wherein, $R^6$ represents a hydrogen atom, an alkyl group having 1 to 8 carbon atoms, or a cycloalkyl group having 5 to 8 carbon atoms)];

an amine compound (A) having a hydroxyalkyl group; and an organic material wherein, with respect to 100 parts by mass of the compound (I), the content of the compound (II) is 0.005 to 4 parts by mass, and the content of the amine compound (A) is 0.01 to 15 parts by mass.

7. The organic material composition according to claim 6, comprising the process stabilizer, comprising:

a compound (I) represented by Formula (I):

(I)

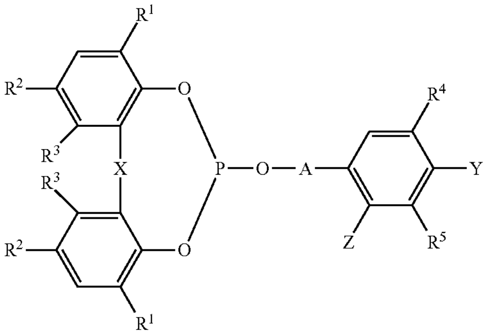

[in Formula (I), $R^1$, $R^2$, $R^4$, and $R^5$ each independently represent a hydrogen atom, an alkyl group having 1 to 8 carbon atoms, a cycloalkyl group having 5 to 8 carbon atoms, an alkylcycloalkyl group having 6 to 12 carbon atoms, an aralkyl group having 7 to 12 carbon atoms, or a phenyl group, $R^3$s each independently represent a hydrogen atom or an alkyl group having 1 to 8 carbon atoms, X represents a single bond, a sulfur atom, or a —CH(—$R^6$)— group (wherein, $R^6$ represents a hydrogen atom, an alkyl group having 1 to 8 carbon atoms, or a cycloalkyl group having 5 to 8 carbon atoms).

A represents an alkylene group having 1 to 8 carbon atoms or a *—C(═O)—$R^7$— group (wherein, $R^7$ represents a single bond or an alkylene group having 1 to 8 carbon atoms, and * represents a bond on the oxygen side), and one of Y and Z represents a hydroxyl group, an alkoxy group having 1 to 8 carbon atoms, or an aralkyloxy group having 7 to 12 carbon atoms, while the other represents a hydrogen atom or an alkyl group having 1 to 8 carbon atoms];

a compound (II) represented by Formula (II):

(II)

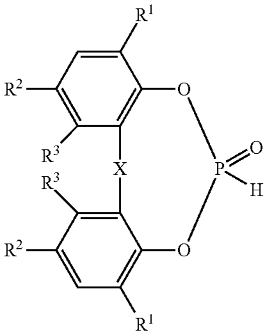

[in Formula (II).

$R^1$ and $R^2$ each independently represent a hydrogen atom, an alkyl group having 1 to 8 carbon atoms, a cycloalkyl group having 5 to 8 carbon atoms, an alkylcycloalkyl group having 6 to 12 carbon atoms, an aralkyl group having 7 to 12 carbon atoms, or a phenyl group, $R^3$s each independently represent a hydrogen atom or an alkyl group having 1 to 8 carbon atoms, and X represents a single bond, a sulfur atom, or a —CH(—$R^6$)— group (wherein, $R^6$ represents a hydrogen atom, an alkyl group having 1 to 8 carbon atoms, or a cycloalkyl group having 5 to 8 carbon atoms)]; and an amine compound (A) having a hydroxyalkyl group, wherein, with respect to 100 parts by mass of the compound (I), the content of the compound (II) is 0.005 to 4 parts by mass, and the content of the amine compound (A) is 0.01 to 15 parts by mass as the compound (I), the compound (II), and the amine compound (A).

8. The organic material composition according to claim 6, wherein the organic material is a thermoplastic resin.

9. The organic material composition according to claim 8, wherein the thermoplastic resin is a polyolefin or an engineering plastic.

10. A method of stabilizing an organic material, the method comprising:

adding a compound (I) represented by Formula (I), a compound (II) represented by Formula (II), and an amine compound (A) having a hydroxyalkyl group to the organic material in such amounts that, with respect to 100 parts by mass of the compound (I), the content of the compound (II) is 0.005 to 4 parts by mass, and the content of the amine compound (A) is 0.01 to 15 parts by mass:

(I)

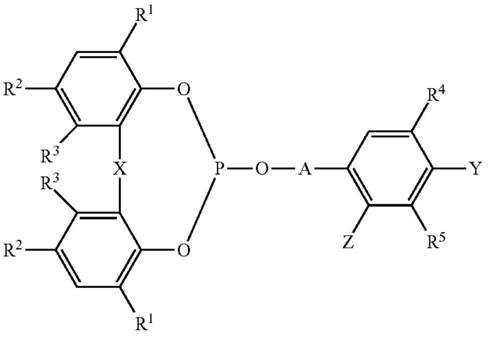

[in Formula (I), $R^1$, $R^2$, $R^4$, and $R^5$ each independently represent a hydrogen atom, an alkyl group having 1 to 8 carbon atoms, a cycloalkyl group having 5 to 8 carbon atoms, an alkylcycloalkyl group having 6 to 12 carbon atoms, an aralkyl group having 7 to 12 carbon atoms, or a phenyl group, $R^3$s each independently represent a hydrogen atom or an alkyl group having 1 to 8 carbon atoms, X represents a single bond, a sulfur atom, or a —CH(—$R^6$)— group (wherein, $R^6$ represents a hydrogen atom, an alkyl group having 1 to 8 carbon atoms, or a cycloalkyl group having 5 to 8 carbon atoms), A represents an alkylene group having 1 to 8 carbon atoms or a *—C(═O)—$R^7$— group (wherein, $R^7$ represents a single bond or an alkylene group having 1 to 8 carbon atoms, and * represents a bond on the oxygen side), and one of Y and Z represents a hydroxyl group, an alkoxy group having 1 to 8 carbon atoms, or an aralkyloxy group having 7 to 12 carbon atoms, while the other represents a hydrogen atom or an alkyl group having 1 to 8 carbon atoms],

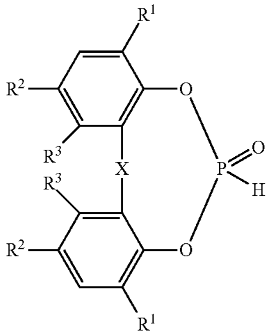

(II)

[in Formula (II), $R^1$ and $R^2$ each independently represent a hydrogen atom, an alkyl group having 1 to 8 carbon atoms, a cycloalkyl group having 5 to 8 carbon atoms, an alkylcycloalkyl group having 6 to 12 carbon atoms, an aralkyl group having 7 to 12 carbon atoms, or a phenyl group, R3s each independently represent a hydrogen atom or an alkyl group having 1 to 8 carbon atoms, and X represents a single bond, a sulfur atom, or a —CH(—$R^6$)— group (wherein, $R^6$ represents a hydrogen atom, an alkyl group having 1 to 8 carbon atoms, or a cycloalkyl group having 5 to 8 carbon atoms)]; or adding the process stabilizer according to claim 1 to the organic material.

11. The method according to claim 10, wherein the organic material is a thermoplastic resin.

12. The method according to claim 11, wherein the thermoplastic resin is a polyolefin or an engineering plastic.

* * * * *